(12) United States Patent
Kelly et al.

(10) Patent No.: US 10,465,575 B2
(45) Date of Patent: Nov. 5, 2019

(54) SYSTEMS AND METHODS FOR WARMING UP AN ENGINE WITH AN ELECTRIC BOOST DEVICE

(71) Applicant: Ford Global Technologies, LLC, Dearborn, MI (US)

(72) Inventors: Tyler Kelly, Plymouth, MI (US); Baitao Xiao, Canton, MI (US); David Bell, Plymouth, MI (US); Julia Helen Buckland, Commerce Township, MI (US); Timothy Stolzenfeld, Livonia, MI (US); Gregory Patrick McConville, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 181 days.

(21) Appl. No.: 15/816,391

(22) Filed: Nov. 17, 2017

(65) Prior Publication Data

US 2019/0153916 A1    May 23, 2019

(51) Int. Cl.
*F01M 5/02* (2006.01)
*F01P 3/20* (2006.01)
*F02B 39/10* (2006.01)

(52) U.S. Cl.
CPC .......... *F01M 5/021* (2013.01); *F01P 3/20* (2013.01); *F02B 39/10* (2013.01); *F01P 2060/12* (2013.01)

(58) Field of Classification Search
CPC ..... F01M 5/021; F01P 3/20; F01P 7/02; F01P 2001/023; F01P 2005/046; F01P 2025/08; F02D 17/026; F02D 13/06; F02D 17/023; F02D 17/04; F02D 13/08; F02B 39/10
See application file for complete search history.

(56) References Cited

U.S. PATENT DOCUMENTS

| | | |
|---|---|---|
| 4,508,068 A | 4/1985 | Tuggle et al. |
| 5,605,045 A | 2/1997 | Halimi et al. |
| 6,705,084 B2 | 3/2004 | Allen et al. |
| 6,735,945 B1 | 5/2004 | Hall et al. |
| 6,871,499 B1 | 3/2005 | Allen et al. |
| 7,779,634 B2 | 8/2010 | Barthelet et al. |
| 8,371,121 B2 | 2/2013 | Godeke et al. |
| 8,544,453 B2 | 10/2013 | Bell et al. |
| 9,127,626 B2 | 9/2015 | Banker et al. |
| 2011/0167815 A1* | 7/2011 | Ulrey .................. F02D 13/0249 60/602 |
| 2015/0314669 A1* | 11/2015 | Noda ..................... F25B 25/005 62/324.1 |
| 2018/0119578 A1* | 5/2018 | Zhou ....................... F01K 15/02 |

\* cited by examiner

*Primary Examiner* — Syed O Hasan
(74) *Attorney, Agent, or Firm* — Geoffrey Brumbaugh; McCoy Russell LLP

(57) ABSTRACT

Methods and systems are provided for warming an engine and/or engine fluids. In one example, a method may comprise powering on an electric motor of an intake boost device to generate heat, circulating coolant and/or engine oil through the boost device to absorb the heat produced by the boost device, and then flowing the coolant and/or engine oil to the engine to transfer the heat absorbed from the boost device to the engine. In this way, an engine may be warmed without running the engine rich by using the heat generated by the electric motor of the boost device to warm the engine.

19 Claims, 8 Drawing Sheets

SYSTEMS AND METHODS FOR WARMING UP AN ENGINE WITH AN ELECTRIC BOOST DEVICE

FIELD

The present description relates generally to systems and methods for heating an engine with an intake boost device that is at least partially driven by an electric motor.

BACKGROUND/SUMMARY

Internal combustion engines are operated within a desired temperature range to optimize performance and minimize engine wear/degradation. Running the engine cold (below the desired operating temperature) may result in increased engine wear, tailpipe emissions, and fuel dilution. For example, when too cold, exhaust catalysts will not adequately process the unwanted products of combustion leading to increased tailpipe emissions. Further, heat exchangers such as the cabin heater and other lubricated devices such as the transmission and differential oil coolers may require warmed fluids to function properly. Engines typically run cold during and/or immediately after an engine start because they cool down when not running. Thus, after a long cold soak, the engine system must be heated during and/or immediately after an engine start. Engines also tend to run cold at idle and may require additional warming while running at idle.

One example approach for warming an engine during a cold start is shown by Tuggle et al. in U.S. Pat. No. 4,508,068. Therein, the engine is run rich (the air/fuel ratio is operated rich of stoichiometry) to improve engine starting and warm-up. However, the inventors herein have recognized potential issues with such an approach. As one example, the excess fuel injected while running rich may condense on the cold combustion chamber walls of the engine and wash into the oil pan, thereby diluting the oil with fuel. Fuel dilution reduces the viscosity of the oil and makes it less effective at lubricating engine components leading to increased wear and degradation of the engine components. As another example, not all of the injected fuel may be combusted while running rich because of the increased amount of injected fuel. This incomplete combustion may lead to higher levels of tailpipe emissions while the engine is warming up.

The inventors herein have recognized that by heating the engine with waste heat generated by electrically powered devices in the engine and/or vehicle system, the amount of enrichment during an engine start and/or idle may be reduced. Therefore, the issues described above may be at least partially addressed by a method comprising: powering on an electric motor of an intake boost device to generate heat; absorbing heat from one or more of the boost device and air compressed by the boost device via one or more of circulated coolant and circulated engine oil; and after absorbing the heat, transferring the absorbed heat to the engine by flowing one or more of the circulated coolant and circulated engine oil to the engine. By warming the engine with heat produced by an electrically powered boost device, dilution of engine oil with fuel and tailpipe emissions may be reduced. In particular, the boost device may comprise an electrically driven supercharger and/or an exhaust driven turbocharger that is also at least partially driven by an electric motor (electrically assisted turbocharger). The electric motor of the boost device may generate heat as it runs, and may also heat the intake air that it compresses. Thus, the heat from the hot, compressed intake air, and heat produced by the electric motor itself, may be transferred to the engine via circulated coolant and/or engine oil. In some examples, this heat may additionally or alternatively be used to warm the coolant and/or engine oil.

In another example, an electric motor of the boost device may be powered on, and one or more of coolant and engine oil may be circulated through the running boost device and the engine via one or more of a coolant pump and an engine oil pump, respectively, to warm the engine when a temperature of the engine is less than a desired temperature. Under varying engine operating conditions, different control actions may be performed in addition to powering the electric motor of the boost device and circulating the coolant and/or engine oil. For example, prior to an engine start (when the engine is not running), a compressor bypass valve (CBV) may be opened to allow the boost device to continue to recirculate air in the intake while it is running rather than build pressure in the intake. However, when the engine is running, the CBV may be closed to build intake manifold pressure in anticipation of a vehicle launch (vehicle operator tip-in), and one or more engine operating parameters may be adjusted to limit torque output to a desired torque output level prior to the vehicle launch.

In another example, an engine system may comprise: an oil pump; a coolant pump; an engine block fluidically coupled to one or more of the coolant pump and oil pump, the engine block comprising one or more engine cylinders; an intake boost device at least partially driven by an electric motor and fluidically coupled to the engine and one or more of the coolant pump and oil pump; a boost device bypass valve that enables airflow around the intake boost device in an open position; and a controller. The controller may include computer readable instructions stored in non-transitory memory for: powering the electric motor of the intake boost device to generate heat; powering one or more of the coolant pump and oil pump to circulate one or more of coolant and engine oil through the intake boost device and the engine; opening the boost device bypass valve when the engine is off; and closing the boost device bypass valve when the engine is running.

In this way, an electric motor of a boost device may be used in place of, or in addition to, air/fuel ratio enrichment to warm up an engine. Heating the engine with the boost device may reduce the amount of air/fuel enrichment used to warm up the engine, and/or may eliminate the use of such enrichment entirely, thereby reducing tailpipe emissions. Further, by reducing and/or eliminating the use of such enrichment, fuel dilution of oil may be reduced and/or prevented, thereby better retaining the integrity and effectiveness of the oil in lubricating rotating engine components. By warming the engine oil prior to an engine start, the oil's effectiveness in lubricating rotating engine components may be increased during an engine start, thereby increasing the longevity of the engine. Additionally, the mitigation of such fuel enrichment reduces fuel consumption and increases fuel efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
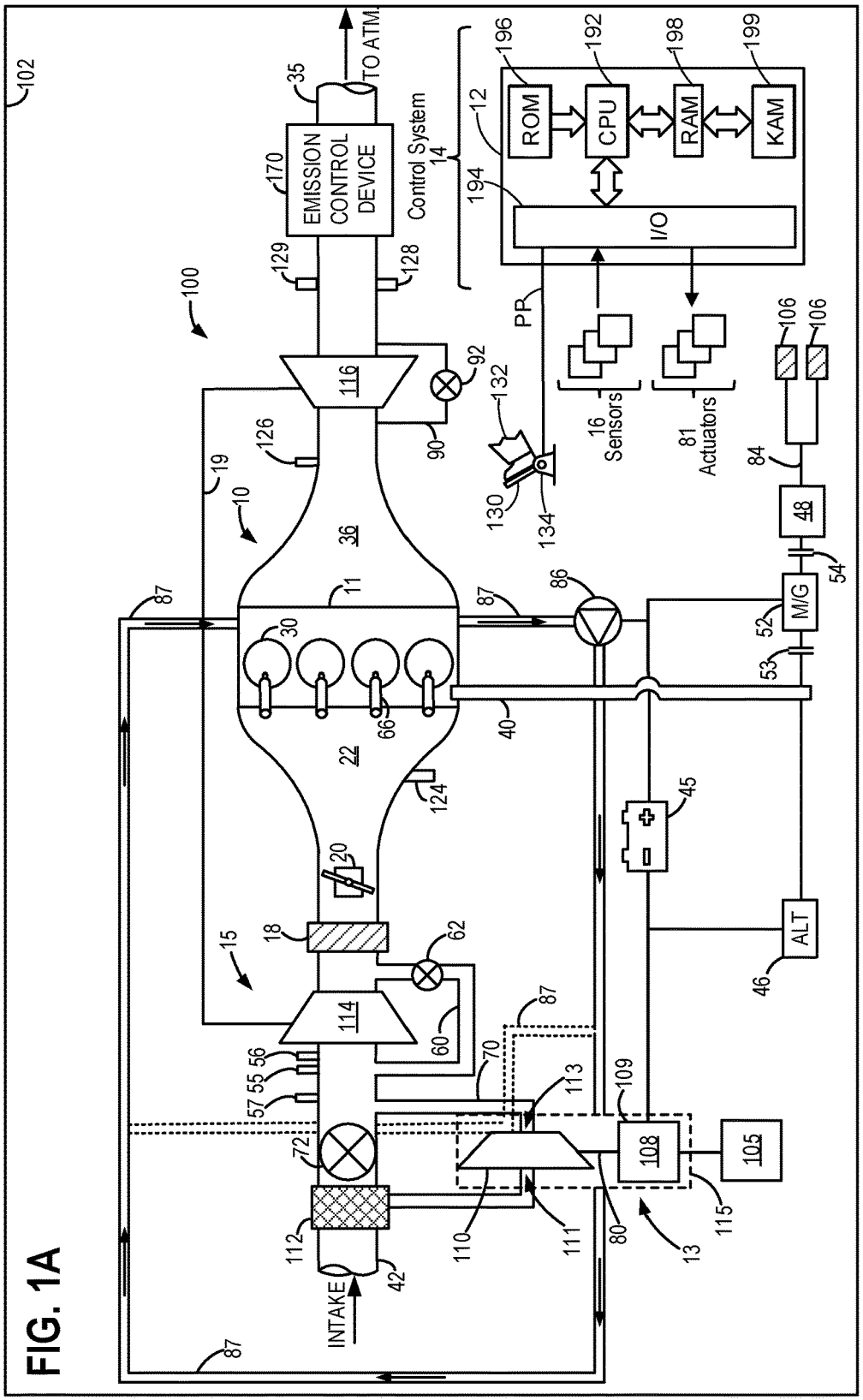
FIG. 1A shows a schematic diagram of an example embodiment of a boosted engine system having an electric supercharger through which an engine fluid (e.g., engine oil, coolant, etc.) may be circulated.
Figure 1B:
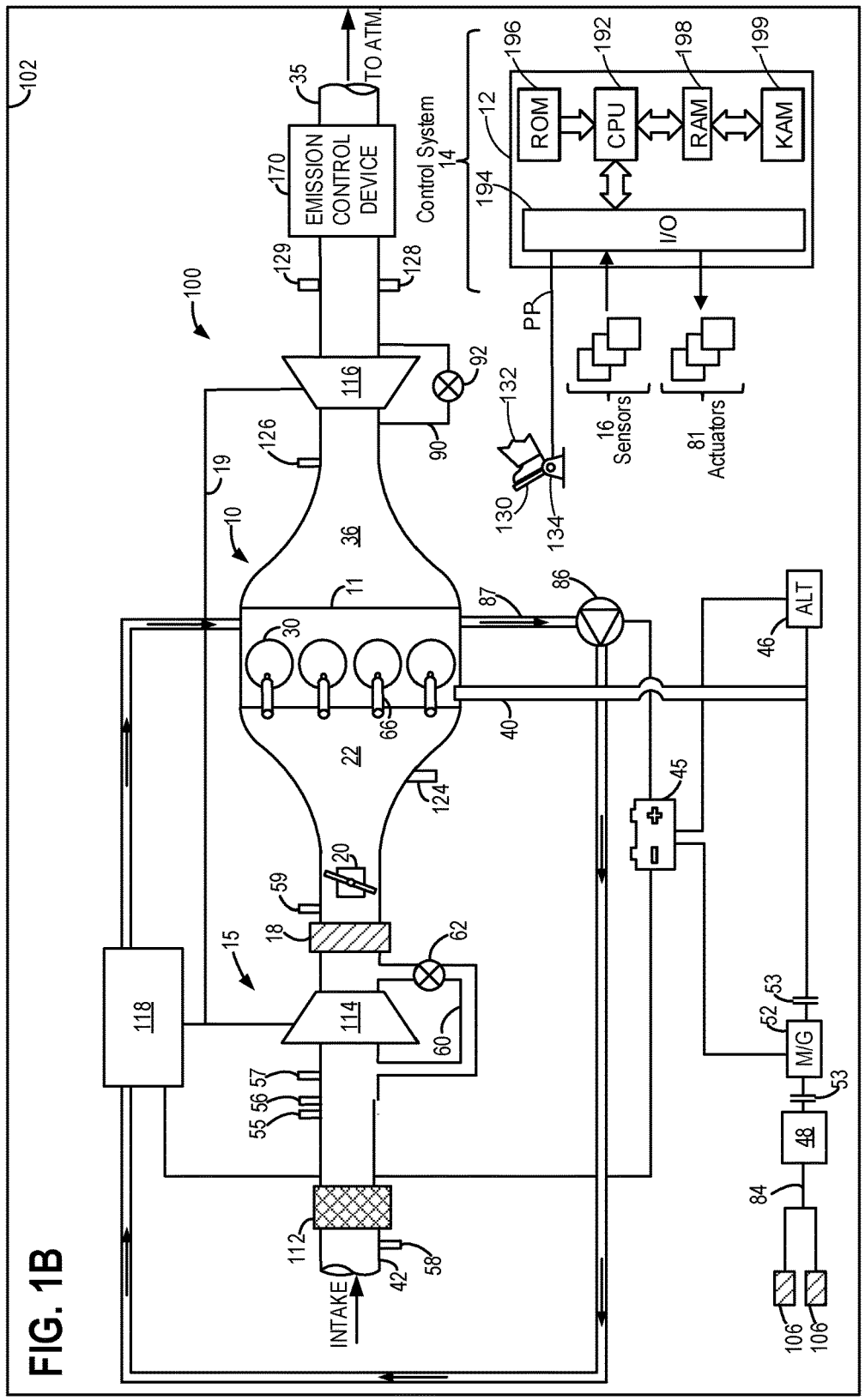
FIG. 1B shows a schematic diagram of an example embodiment of a boosted engine system having an electrically assisted turbocharger through which an engine fluid (e.g., engine oil, coolant, etc.) may be circulated.

The following description relates to systems and methods for warming an engine with heat generated by one or more electrically powered devices included in the engine and/or vehicle in which the engine is included. A vehicle, such as the example vehicle shown in FIGS. 1A-2, may include an engine system comprising one or more compressors in the intake for boosting the pressure of air provided to the cylinders of the engine. One or more of the compressors may be at least partially powered by an electric motor. Electric compressors are typically more responsive than exhaust driven turbochargers and therefore may be utilized to provide a more immediate increase in intake pressure while the exhaust driven turbocharger spools up. Electric compressors may also be powered independently of the engine, enabling boost pressure to be built up in anticipation of a tip-in, thereby further increasing the responsiveness of the engine. An example engine system including an electric supercharger is shown in FIG. 1A, and an example engine system including an electrically assisted turbocharger is shown in FIG. 1B.

The electric motors and compressor wheels of the intake boost devices also generate heat when they operate, and the inventors herein have recognized that this waste heat can be utilized to warm engine fluids, such as coolant and engine oil, and the engine itself, when these components are cooler than desired. During an engine start, warming up engine oil with the waste heat may help the oil more effectively lubricate rotating components of the engine. Further, these warm engine fluids can in turn be used to heat up the engine more quickly during an engine start, reducing and/or preventing the amount that the engine is run rich.

Further, these warming strategies may also be used while an engine is running. However, while the engine is running, warming of the engine is typically desired when boost is not desired. For example, the engine may run cold during engine idle where the vehicle operator has tipped out and is not requesting torque. Thus, as shown in the example methods of FIGS. 5 and 6, an engine controller may power on the motor of the electric boost device to warm the engine fluids when desired, and may open a bypass valve to limit the amount of pressure added to the intake air by the boost device. However, in other examples, such as during a performance mode where a vehicle operator is repeatedly tipping out and then tipping in (e.g., during off-roading, rock crawling, etc.) it may be desired to maintain a relatively high manifold pressure during the tip-out in anticipation of an imminent tip-in. Thus, when a vehicle launch or tip-in is imminent, the electric boost device and bypass valve may also be adjusted in anticipation of, and during, a vehicle launch to take advantage of the already spinning boost device to more immediately provide the desired increase in torque.

Figure 2:
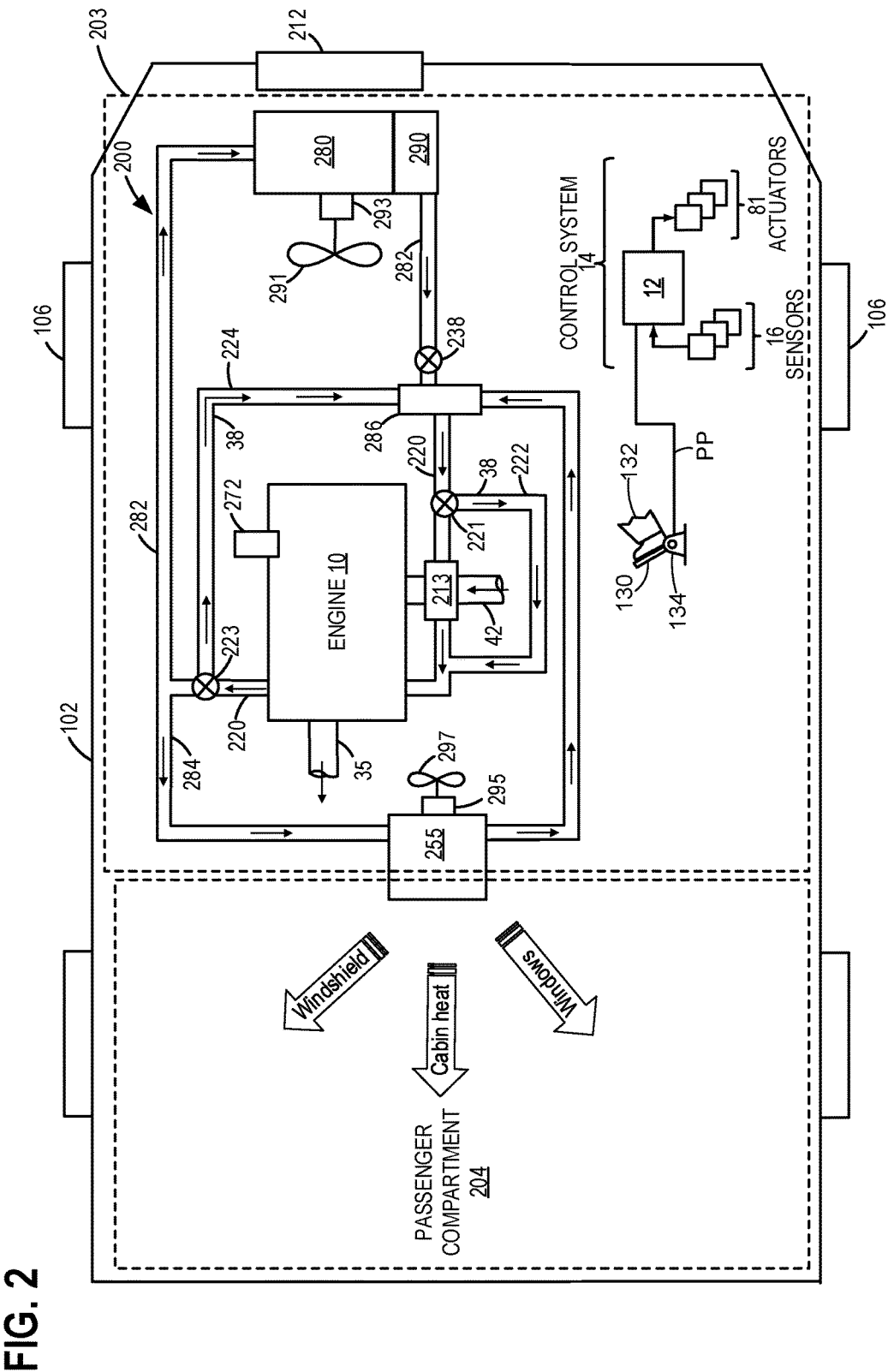
FIG. 2 shows a schematic diagram of a first example embodiment of a coolant circuit for a boosted engine system, such as the boosted engine systems of FIGS. 1A and 1B, that enables coolant to be circulated through the engine system's boost device.
Figure 3:
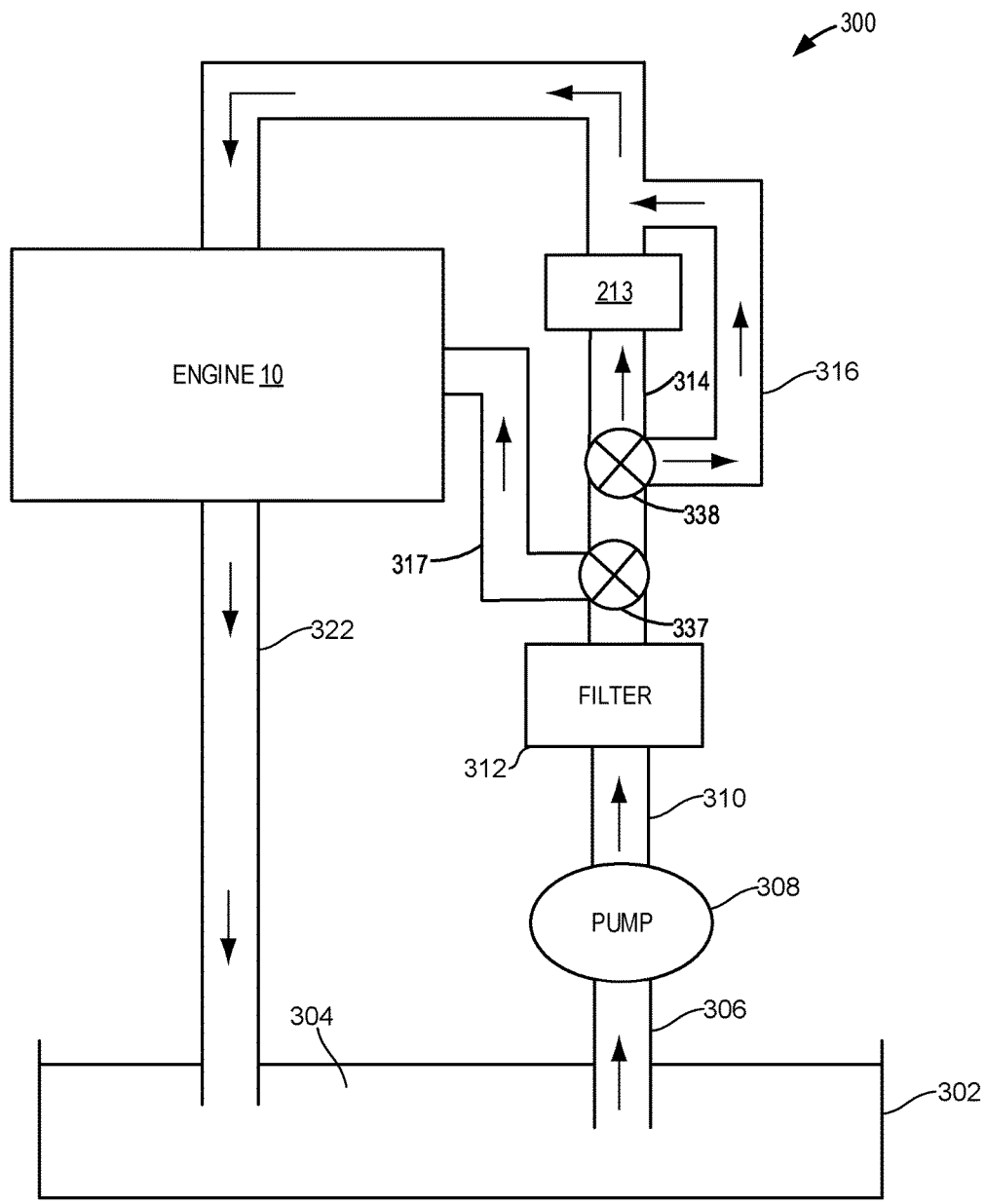
FIG. 3 shows a schematic diagram of an example embodiment of an engine oil circuit for a boosted engine system, such as the boosted engine systems of FIGS. 1A and 1B, that enables engine oil to be circulated through the engine system's boost device.

The engine fluids may be warmed by the motor of the boost device by flowing the fluids through the boost device and/or near an outlet of the boost device. Example coolant circuits that enable coolant flow through a boost device are shown in FIG. 2. An example oil circuit that enables oil flow through a boost device is shown in FIG. 3. By warming the engine fluids with the heat generated by the electric boost device, the amount of enrichment of the air/fuel ratio needed to heat the engine to a desired temperature may be reduced, and thus, fuel dilution and tailpipe emissions may be reduced.

FIGS. 1A and 1B show two embodiments of a boosted engine system. In the example of FIG. 1A, the boosted engine system may include an electric supercharger, and in the example of FIG. 1B, the boosted engine system may include an electrically assisted turbocharger. In both of the embodiments of FIGS. 1A and 1B, an engine fluid (e.g., coolant, engine oil, etc.) may be circulated through the electrically driven boost device and/or proximate an outlet of the boost device to warm the engine fluid and in turn warm the engine by flowing the heated fluid through the engine.

FIG. 1A schematically shows aspects of an example engine system 100, including an engine 10 coupled in a vehicle 102. In some examples, vehicle 102 may be a hybrid vehicle with multiple sources of torque available to one or more vehicle wheels 106. In other examples, vehicle 102 is a conventional vehicle with only an engine. In the example shown, a powertrain of vehicle 102 includes engine 10 and an electric machine 52. Electric machine 52 may be a motor or a motor/generator. Engine 10 and electric machine 52 are connected to vehicle wheels 106 via a transmission 48 when one or more clutches 53 and 54 are engaged. In the depicted example, a (first) clutch 53 is provided between engine 10 and electric machine 52, and a (second) clutch 54 is provided between electric machine 52 and transmission 48. A controller 12 may send a signal to an actuator of each clutch 53 and 54 to engage or disengage the clutch, thereby connecting or disconnecting engine 10 from electric machine 52 and the components connected thereto and/or connecting or disconnecting electric machine 52 from transmission 48 and the components connected thereto. For example, torque from engine 10 may be transferred to vehicle wheels 106 via a crankshaft 40, transmission 48, and a powertrain shaft 84 when clutches 53 and 54 are engaged. Transmission 48 may be a gearbox, a planetary gear system, or another type of transmission. Transmission 48 may be a fixed ratio transmission that includes a plurality of gear ratios to allow engine 10 to rotate at a different speed than wheels 106. By changing a torque transfer capacity of first clutch 53 (e.g., an amount of clutch slippage), an amount of engine torque relayed to the wheels via powertrain shaft 84 may be modulated.

The powertrain may be configured in various manners, including as a parallel, a series, or a series-parallel hybrid vehicle. In electric vehicle embodiments, a system battery 45 may be a traction battery that delivers electrical power to electric machine 52 to provide torque to vehicle wheels 106. In some embodiments, electric machine 52 may also be operated as a generator to provide electrical power to charge system battery 45, for example, during a braking operation. It will be appreciated that in other embodiments, including non-electric vehicle embodiments, system battery 45 may be a typical starting, lighting, ignition (SLI) battery coupled to an alternator 46.

Alternator 46 may be configured to charge system battery 45 using engine torque drawn from the crankshaft 40 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems, as described further below, based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

In the depicted embodiment of FIG. 1A, engine 10 is a compound boosted engine configured with multiple, staged boosting devices. Specifically, engine 10 includes a first boosting device staged upstream of a second boosting device. The depicted configuration results in a first compressor 110 (of the first boosting device) being positioned in an engine intake passage 42 upstream of a second compressor 114 (of the second boosting device). At least one of the boosting devices may be configured with electric assistance from an electric motor. In the present example, the first boosting device is an electric supercharger 13 configured to operate with electric assistance from an electric motor, while the second boosting device is a turbocharger 15. However, other combinations and configurations of boosting devices may be possible without departing from the scope of this disclosure. For example, in alternate embodiments, turbocharger 15 may be an electric turbocharger having an electric motor coupled to the compressor, turbine, or turbocharger shaft while the supercharger is configured as an electrical or mechanical supercharger. In another alternate embodiment, the electric supercharger may be placed downstream of the turbocharger. In still other examples, both the first and second boosting device may be electric superchargers or electric turbochargers. FIG. 1B shows an example where the engine system 100 includes an electrically assisted turbocharger and no supercharger. However, in other examples, the engine system 100 may include an electric supercharger and an electrically assisted turbocharger.

In the depicted example, electric supercharger 13 includes first compressor 110, which is driven by an electric motor 108. Specifically, a fan of first compressor 110 may be driven by power received from electric motor 108 along a supercharger compressor shaft 80. In some examples, first compressor 110 of supercharger 13 may additionally be driven by the engine crankshaft via a clutch and gear mechanism. Electric motor 108 may be powered by an on-board energy storage device, such as system battery 45 and/or its own dedicated battery 105. Electric motor 108 may be additionally or alternatively powered by alternator 46. An amount of electrical power delivered to electric motor 108 may be varied by the controller 12 by, for example, adjusting the duty cycle of a pulse width modulated (PWM) signal sent to the motor 108.

First compressor 110 is positioned in the engine intake in parallel with an electric supercharger bypass valve (ESBV) 72. The ESBV may be an electrically actuated valve and may be in electrical communication with the controller 12. Thus, the controller 12 may adjust the position of the ESBV 72 (and other valves described herein) by adjusting a command signal sent to the ESBV. For example, the controller 12 may adjust the position of the ESBV 72 and other valves described herein by adjusting a duty cycle of the PWM signal sent to the ESBV 72 and other valves described herein. The position of the ESBV 72 may be adjusted by the controller 12 to adjust an amount of airflow through the ESBV 72. In a fully closed position, the ESBV 72 may force substantially all of the airflow in the intake through the compressor 110 of the supercharger 13. However, when open, ESBV 72 may permit air to bypass the compressor 110 of the supercharger 13 and flow directly to the second compressor 114 without flowing through the compressor 110 while the engine 10 is running. When the engine is not running, but the supercharger 13 is being powered, the ESBV 72 may be opened to permit air to recirculate to upstream of the compressor 110. Similarly, while the engine is running, if the supercharger 13 is being powered and the ESBV 72 is open, if the airflow through the supercharger 13 exceeds the airflow through the engine, air may flow through the ESBV 72 in a direction that allows the flow to recirculate through the supercharger 13. In this way, the supercharger 13 may be powered on without adding boost, by recirculating intake air around the compressor 110, through first compressor passage 70 and intake passage 42. Thus, when the ESBV 72 is open, the compressor 110 is spinning, air may flow from an outlet 113 of the compressor 110 back to an inlet 111 of the compressor 110 through passages 70 and 42. In another example, when the engine is not running, the supercharger 13 may be powered on, and the ESBV 72 may be closed to increase boost pressure when a tip-in is anticipated.

Thus, air may enter first compressor 110 when the opening of the ESBV 72 is closed, thereby directing incoming air from an air box 112 through the first compressor passage 70 and first compressor 110, where it is pressurized for delivery to the second compressor 114. Fresh air received at an inlet 111 of second compressor 114 is then compressed and introduced into engine 10.

Under engine running conditions when the first compressor 110 is not flowing sufficient air to increase air pressure downstream of the outlet 113 relative to upstream of the inlet 111, opening ESBV 72 increases an amount of air entering second compressor 114 without having passed through first compressor passage 70 and first compressor 110. During conditions when ESBV 72 is fully opened (fully open first position), compressed air may be delivered to engine 10 via second compressor 114 of turbocharger 15 only. The ESBV 72 may be an electrically actuated valve that may be adjusted to a fully open first position, a fully closed second position, and/or one or more positions between the first and second positions.

Under engine running conditions where the compressor 110 is able to provide sufficient airflow to increase air pressure downstream of the outlet 113 above the air pressure upstream of the inlet 111, opening ESBV 72 will allow air that has already passed through the compressor 110 to recirculate back to the inlet 111 of the compressor 110. Thus, air may flow from the outlet 113 through passage 70 to the ESBV 72, through the open ESBV 72, and back through passage 70 to the inlet 111 of the compressor 110 (e.g., in a counterclockwise direction as shown in the example of FIG. 1A). With ESBV 72 open in this condition, the pressure at the outlet 113 of the compressor 110 and downstream of the outlet 113 is reduced to nearly the inlet pressure in intake passage 42. This movement and recirculation of air increases the temperature of the air and components in contact with the recirculating air.

Electric motor 108 may be configured as a motor-generator. Thus, during conditions when electric assistance is required for boost build-up, the electric motor may provide positive torque to drive either the centrifugal compressor of the supercharger (or the turbocharger shaft) to improve the transient boost pressure delivery. However, the electric motor is also capable of energy recuperation by "braking" the motor shaft. Therein, negative torque may be applied to the compressor (or shaft), reducing the compressor speed and concurrently charging the system battery (such as battery 45) coupled to the motor.

Turbocharger 15 includes second compressor 114, which is driven by a turbine 116. Second compressor 114 is shown as a turbocharger compressor mechanically coupled to turbine 116 via a shaft 19, the turbine 116 driven by expanding engine exhaust. In one embodiment, the turbocharger may be a twin scroll device. In another embodiment, the turbocharger may be a variable geometry turbocharger (VGT), wherein turbine geometry is actively varied as a function of engine operating conditions.

Fresh air is introduced along intake passage 42 into engine 10 via air box 112 and flows to second compressor 114. During selected conditions, as elaborated below, air compressed by turbocharger 15 may be recirculated from an outlet to an inlet of second compressor 114 through a second compressor bypass passage 60 by adjusting an opening of a compressor recirculation valve (CRV) 62. CRV 62 may be a continuously variable valve, and increasing the opening of the CRV 62 may include actuating (or energizing) a solenoid of the valve. One or both of CRV 62 and ESBV 72 may be continuously variable valves wherein a position of the valve is continuously variable from a fully closed position to a fully open position.

Second compressor 114 is coupled to a throttle valve 20 through a charge-air cooler (CAC) 18. Air flows from second compressor 114 through CAC 18 and throttle valve 20 to an intake manifold 22. Air then flows to combustion chambers 30 of engine block 11 of engine 10. Thus, the engine block 11 may include the combustion chambers 30. CAC 18 may be an air-to-air or water-to-air heat exchanger, for example. Intake manifold pressure (e.g., a pressure of the air charge within the intake manifold) may be determined using a manifold absolute pressure (MAP) sensor 124.

Intake manifold 22 is coupled to a series of combustion chambers 30 of engine block 11 through a series of intake valves (not shown). The combustion chambers are further coupled to an exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted for the desired combustion and emissions-control performance. For example, the cam timing may be adjusted via a variable cam timing system to move the intake and exhaust cams to a position that provides the optimal volumetric efficiency for the given operating conditions.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the depicted example, fuel is provided to each combustion chamber 30 via direct injection by fuel injectors 66. Fuel may be delivered to fuel injectors 66 by a fuel system (not shown) including a fuel tank, a fuel pump, and a fuel rail. In the combustion chambers, combustion may be initiated via spark ignition and/or compression ignition.

As shown in FIG. 1A, exhaust from exhaust manifold 36 is directed to turbine 116 to drive the turbine. When reduced turbine torque is desired, a portion of exhaust may be directed instead through a wastegate 90, bypassing the turbine 116. A wastegate actuator 92 (e.g., wastegate valve) may be actuated open to relieve at least some exhaust pressure from upstream of turbine 116 to a location downstream of turbine 116 via wastegate 90. By reducing exhaust pressure upstream of turbine 116, turbine speed may be reduced.

The combined flow from turbine 116 and wastegate 90 flows through an emission control device 170. In general, emission control device 170 may include one or more exhaust after-treatment components configured to reduce an amount of one or more substances in the exhaust flow. For example, one exhaust after-treatment component may be configured to trap $NO_x$ from the exhaust flow when the exhaust flow is lean and to reduce the trapped $NO_x$ when the exhaust flow is rich. In other examples, an exhaust after-treatment component may be configured to disproportionate $NO_x$ or to selectively reduce $NO_x$ with the aid of a reducing agent. In still other examples, emission control device 170 includes a three-way catalyst configured to oxidize residual hydrocarbons and carbon monoxide while reducing $NO_x$ in the exhaust flow. Different exhaust after-treatment catalysts having any such functionality may be arranged in wash coats or elsewhere in emission control device 170, either separately or together. In some embodiments, the emission control device 170 may further include a regeneratable soot filter configured to trap and oxidize soot particles in the exhaust flow.

All or part of the treated exhaust from emission control device 170 may be released into the atmosphere via an exhaust conduit 35. Depending on operating conditions, however, some exhaust may be diverted instead to intake passage 42 via an exhaust gas recirculation (EGR) passage (not shown), including an EGR cooler and an EGR valve. EGR may be recirculated to the inlet of first compressor 110, the inlet of second compressor 114, or both.

One or more sensors may be coupled to the inlet of second compressor 114 (as shown) and/or first compressor 110 (not shown). For example, a temperature sensor 55 may be coupled to the inlet 111 of the first compressor 110 and/or an inlet of the second compressor 114 for estimating a compressor inlet temperature. As another example, a pressure sensor 56 may be coupled to the inlet of the first compressor 110 and/or second compressor 114 for estimating a pressure of air entering the first and/or second compressors, respectively. Still other sensors may include, for example, air-fuel ratio sensors, humidity sensors, etc. In other examples, one or more of the second compressor inlet conditions (such as humidity, temperature, etc.) may be inferred based on engine operating conditions.

One or more engine fluids (e.g., engine oil, coolant, etc.) may be circulated through the engine 10 to lubricate and/or maintain the temperature of the engine 10 at a desired temperature. In particular a pump 86 may be included in engine system 100 to circulate the engine fluid. Pump 86 may be an electrically driven pump and may be coupled to the vehicle battery 45, for example, as a power source. However, in other examples, the pump 86 may include its own battery, and/or may be driven by the engine 10, and in particular, the crankshaft 40. The pump 86 may additionally or alternatively be powered by the alternator 46. Pump 86 may be included in an engine fluid circuit 87 that provides fluidic communication between the pump 86 and engine 10 (engine block 11), for circulating engine fluid between the pump 86 and engine 10. In some examples, fluid circuit 87 may run through the supercharger 13, such that engine fluid may be circulated through the supercharger 13. In particular, a portion of the circuit 87 may be included in a housing 115 of the supercharger 13 and/or a housing 109 of the electric motor 108. In this way, engine fluid circulated through fluid circuit 87 may absorb heat from the electric motor 108 and compressor housing 115 as it passes through the supercharger 13 when the motor 108 is running.

For example, the engine fluid may be circulated through a coolant jacket of the electric supercharger 13. The coolant jacket may provide cooling for one or more of: the motor 108, a controller of the motor 108, a shaft assembly of the supercharger 13, and compressed air at the outlet 113 of the supercharger 13. In another example, as shown by the dotted lines in FIG. 1A, coolant circuit 87 may additionally or alternatively run proximate the outlet 113 of the compressor 110 of the supercharger 13. For example, the coolant circuit 87 may run along and/or may be in direct thermal contact with the outlet 113 of the compressor 110 such that the fluid circuit 87 may absorb heat from the compressor outlet 113 when the air in the compressor outlet 113 is hotter than the fluid in the circuit 87. In another example, the coolant circuit 87 may run along and/or may be in direct thermal contact with the portion of the bypass passage 70 included downstream of the compressor 110, such that the fluid circuit 87 may absorb heat from the air in passage 70 that has been compressed by the compressor 110, when that air is hotter than the fluid in the circuit 87. In this way, the engine fluid circulated through fluid circuit 87 may absorb heat from the hot, compressed air near the outlet 113 of the compressor 110, that is recirculated through ESBV 72 and reintroduced to compressor 110. Conversely, when the fluid in the circuit 87 is hotter than the motor 108 and/or air in the compressor outlet 113, the fluid in the circuit 87 may be cooled.

Controller 12 may be included in a control system 14. Controller 12 is shown receiving information from a plurality of sensors 16 (various examples of which are described herein) and sending control signals to a plurality of actuators 81 (various examples of which are described herein). As one example, sensors 16 may include an exhaust gas sensor 126 located upstream of turbine 116, MAP sensor 124, an exhaust temperature sensor 128, an exhaust pressure sensor 129, compressor inlet temperature sensor 55, compressor inlet pressure sensor 56, and a mass air flow (MAF) sensor 57. Other sensors, such as additional pressure, temperature, air/fuel ratio, and composition sensors, may be coupled to various locations in engine system 100. The actuators 81 may include, for example, throttle valve 20, CRV 62, ESBV 72, electric motor 108, wastegate actuator 92, pump 86, and fuel injector 66. Controller 12 may adjust operation of the actuators 81 by adjusting a command signal or amount of power supplied to the actuators 81. For example, the controller 12 may adjust a duty cycle of a PWM signal sent to the actuators 81 and/or their power sources (e.g., battery 45, alternator 46, battery 105, etc.) to adjust operation of the actuators 81.

Controller 12 is shown in FIGS. 1A and 1B as a microcomputer including: microprocessor unit 192, input/output ports 194, read-only memory 196, random access memory 198, keep alive memory 199, and a conventional data bus. Controller 12 is shown receiving various signals from sensors 16 coupled to engine 10, in addition to those signals previously discussed, including engine a position sensor 134 coupled to an input device 130 for sensing input device pedal position (PP) adjusted by a vehicle operator 132. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

During a tip-out, the operator may fully release the accelerator pedal and/or fully depress the brake pedal. During a tip-in, the operator may depress the accelerator pedal. Thus, the amount of torque requested by the operator 132 may increase with increasing depression of the accelerator pedal. Thus, when the accelerator pedal is fully depressed, the operator 132 may request a maximum torque output from the engine.

Controller 12 may receive input data from the various sensors, process the input data, and employ the various actuators to adjust engine operation based on the received signals and instructions stored on a memory of the controller. The controller may employ the actuators in response to the processed input data based on instruction or code programmed therein corresponding to one or more routines, such as example control routines described herein with regard to FIGS. 4-7 As an example, responsive to engine temperature and/or engine fluid temperature decreasing below a threshold, the controller may increase the electrical power supplied to the electric boost device and route engine fluid through the boost device and the engine to warm the engine with the heat generated by the running electric boost device.

FIG. 1B shows an alternate embodiment of engine system 100, wherein the supercharger 13 is not included in the engine system 100, and the turbocharger 15 is configured as an electrically assisted turbocharger that receives power from an electric motor 118. Thus, in the embodiment shown in FIG. 1B, the compressor 114 of the turbocharger may be at least partially driven by electric motor 118. Thus, the compressor 114 may receive power from electric motor 118 and/or turbine 116 via shaft 19. In some examples, motor 118 may be included between the turbine 116 and compressor 114 and may provide power to the compressor 114 via shaft 19. However in other examples, the electric motor 118 may be coupled to the compressor 114 via its own dedicated mechanical linkage such as a belt, shaft, chain, etc. Electric motor 118 may be operated by the controller 12 in the same or similar manner to electric motor 108 described above in FIG. 1A. Electric motor 118 may be coupled to a fan of the compressor 114 to provide added boost while the turbine 116 is spinning up. Further, the electric motor 118 may be run in a similar manner to motor 108 described above in FIG. 1A to generate heat to warm up engine fluids and the engine.

Further instead of fluid circuit 87 running through the supercharger 13 (not shown in FIG. 1B), the circuit 87 may instead run through the motor 118 of the turbocharger 15 in the embodiment of the engine system 100 shown in FIG. 1B. In this way, fluid in the circuit 87 may absorb heat from the motor 118 as it flows through the turbocharger 15.

Various embodiments of the fluid circuit 87 are illustrated below in FIGS. 2 and 3. In particular, FIG. 2 shows an example where the fluid circuit 87 may be configured as a coolant circuit to circulate engine coolant. FIG. 3 shows an example where the fluid circuit 87 may be configured as an oil circuit to circulate engine oil.

Turning now to FIG. 2, it shows an embodiment of a coolant circuit that may be included in the engine system 100 described above in FIGS. 1A and 1B as the fluid circuit 87. In particular, FIG. 2 shows an example embodiment of a vehicle heating, ventilation, and air-conditioning (HVAC) system 200 in vehicle 102. Herein, HVAC system 200 is also referred to as cooling system 200. Vehicle 102 has drive wheels 106, a passenger compartment 204 (herein also referred to as cabin), and an under-hood compartment 203. Passenger compartment 204 includes a cabin greenhouse formed by the windshield (not shown) and other glass windows including a rear window (not shown). Under-hood compartment 203 may house various under-hood components under the hood (not shown) of vehicle 102. For example, under-hood compartment 203 may house a powertrain including internal combustion engine 10.

Under-hood compartment 103 may further include HVAC system 200 that circulates coolant through internal combustion engine 10 to absorb waste heat, and distributes the heated coolant to radiator 280 and/or heater core 255 via coolant lines 282 and 284, respectively. In one example, as depicted, cooling system 200 may be coupled to engine 10 and may circulate engine coolant from engine 10 to radiator 280 via coolant pump 286, and back to engine 10 via coolant line 282. Coolant pump 286 may be the same or similar to pump 86 described above with reference to FIGS. 1A and 1B. The coolant pump 286 may be an electric pump and, in one example, may circulate a fixed amount of coolant based on engine temperature. Specifically, coolant pump 286 may circulate coolant through passages in the engine block, head, etc., to absorb engine heat, which is then transferred via the radiator 280 to ambient air. Alternatively, as will be shown in this disclosure, the coolant may be circulated through an electrically powered boost device 213 to absorb heat from the boost device 213 and then to the engine 10 to warm the engine 10.

Boost device 213 may be a supercharger such as supercharger 13 described above in FIG. 1, and/or may comprise an electrically assisted turbocharger, such as the embodiment of the turbocharger 15 described above in FIG. 1B.

The temperature of the coolant may be regulated by a thermostat (or thermostat valve) 238, located in the cooling line 282, which may be kept closed until the coolant reaches a threshold temperature and/or until the engine reaches a threshold temperature. Thus, the valve 238 may prevent coolant flow to the engine when the engine is warming up and cooling of the engine is not desired and/or when the coolant is too cold and flowing the coolant to the engine would cool the engine more than desired. In one embodiment, thermostat valve 238 may be an electric thermostat valve and may be adjusted by the controller 12 independent of coolant temperature.

Thermostat valve 238 may proportion flow between coolant line 284 (also termed as an engine loop) and coolant line 282 (also termed as a radiator loop). In the example of a coolant system including a degas bottle, valve 238 may be a three way thermostat valve. The thermostat valve 238 may control an amount of coolant flow within each of coolant lines 282 and 284. In one example, based on existing ambient and engine conditions, thermostat valve 238 may allow dominant flow within either coolant line 282 or coolant line 284. For example, if the powertrain retains residual heat, coolant may transfer heat from the powertrain to heater core 255 and there on to passenger compartment 204 and/or windshield and cabin greenhouse. Herein, thermostat valve 238 may block coolant line 282 and allow dominant coolant flow within coolant line 284.

Coolant may flow through coolant line 282, as described above, and/or through coolant line 284 to heater core 255 where heat may be transferred from the coolant to passenger compartment 204, and the coolant flows back to engine 10. Heater core 255 may thus act as a heat exchanger between the coolant and the passenger compartment 204. Fins may be attached to the heater core to increase the surface area for heat transfer. Air may be forced past the fins, for example by operating blower fan 297, to expedite heating of the passenger compartment. Hot air may also be blown by blower fan 297 through vents that direct heat to windshields and other windows (herein also referred to as cabin greenhouse) within the passenger compartment. Blower fan 297 is depicted in this embodiment as an electric fan connected to motor 295 that is powered by a battery (e.g., battery 45 described above in FIGS. 1A and 1B).

One or more cooling fans may be included in cooling system 200 to provide airflow assistance and augment an airflow through the under-hood components. For example, electric cooling fan (herein also referred to as radiator fan) 291, coupled to radiator 280, may be operated when the vehicle is moving and the engine is running to provide cooling airflow assistance through radiator 280. Radiator fan 291 may be actuated by motor 293 that is coupled to the fan 291. Motor 293 may be coupled to the controller 12 and/or battery (e.g., battery 45 described above in FIGS. 1A and 1B). The controller may adjust operation of the fan 291 by controlling an amount of electrical power supplied to the motor 293 by the battery and/or alternator. Radiator fan 291 may draw a cooling airflow into under-hood compartment 203 through an opening in the front-end of vehicle 102, for example, through grill 212. Such a cooling air flow may then be utilized by radiator 280 and other under-hood components (e.g., fuel system components, batteries, etc.) to keep the engine and/or transmission cool. Further, the air flow may be used to reject heat from a vehicle air conditioning system. Further still, the airflow may be used to improve the performance of a turbocharged/supercharged engine that is equipped with charge air coolers that reduce the temperature of the air that goes into the intake manifold/engine. Radiator fan 291 is depicted as an electric fan and therefore may be coupled to a battery (e.g., battery 45 described above in FIGS. 1A and 1B) and/or alternator (e.g., alternator 46 described above in FIGS. 1A and 1B).

In the embodiment described herein, boost device 213 may be operated to warm the coolant prior to an engine start, during engine idle, and during any other conditions where the coolant temperature and/or engine temperature are less than desired. For example, when vehicle 102 is parked and shut down for a duration, the powertrain including engine 10 may cool off. Prior to an engine start, controller 12 may periodically monitor powertrain temperature and ambient conditions. For example controller 12 may estimate engine temperature via engine temperature sensor 272. That is the controller 12 may estimate engine temperature based on outputs received from temperature sensor 272 that may be in electrical communication with the controller 12. Prior to and/or during an engine start, the controller may then power on the pump 286 and a motor of the boost device 213 (e.g., motor 108 and/or motor 118 described above in FIGS. 1A and 1B) to circulate coolant through the boost device 213 and warm the coolant with the heat generated by the boost device 213.

In the example of FIG. 2, pump 286 may pump coolant along first coolant passage 220 towards the engine 10. Coolant may be pumped through the boost device 213 en route to the engine 10. As elaborated above, the motor of the boost device 213 may warm the coolant en route to the engine 10 when the engine temperature is less than desired, for example. In some examples, first coolant passage 220 may include a bypass valve 221 that may be adjusted to allow coolant to flow around the boost device 213, through bypass passage 222 to the engine 10 without flowing through the boost device 213. For example, when engine warming is not desired and cooling of the boost device 213 is not needed (e.g., temperature of the boost device 213 is less than a threshold), then the controller 12 may adjust the bypass valve 221 to permit coolant flow through the bypass passage 222 only. As another example, when engine cooling is desired, coolant may bypass the boost device 213 so that the coolant is not warmed by the boost device 213 and may provide more effective cooling to the engine 10. The valve 221 may be an electrically actuated valve that is in electrical communication with the controller 12 and may be adjusted by the controller 12. The valve 221 may be adjusted to a first position where coolant only flows through passage 220 to boost device 213 and engine 10, and a second position where coolant only flows through bypass passage 222 and not through boost device 213. The valve 221 may also be adjusted to one or more positions between the first and second positions.

Coolant may then flow from one or more of boost device 213 and/or bypass passage 222 to the engine 10. The coolant and engine 10 may transfer heat to one another if they are at different temperatures. Coolant may then exit the engine 10 and continue on passage 220. Coolant may then either flow to the heater core 255 via coolant line 284 or to the radiator 280 via coolant line 282.

During certain engine operating conditions, such as prior to an engine start, fans 291 and 297 may not be on, and thus coolant circulated through lines 282 and 284 may not be cooled by the radiator and/or heater core 255. Under conditions where coolant exiting the engine 10 would not be further cooled by being circulated through lines 282 and/or 284, and if engine warming is desired, coolant may be circulated through the boost device 213 to absorb heat, and then through the engine 10 to dissipate this absorbed heat to the engine 10. Coolant may circulate back through lines 282 and 284 without being further cooled. Further, during conditions where it is desired for the coolant to deliver its normal cooling function, coolant may be circulated through the engine 10 to cool the engine (absorb heat from the engine 10) and then through one or more of lines 282 and 284 to be cooled by the fans 291 and 297 of the radiator 280 and/or heater core 255, respectively. In such examples, coolant may bypass the boost device 213 as described above to enhance cooling of the engine 10.

However, the inventors herein have recognized that under certain conditions, engine warming may be desired when coolant would be cooled by the radiator 280 and/or heater core 255. For example, when fans 291 and/or 297 are blowing air, coolant exiting the engine 10 may be cooled if it is circulated through lines 282 and/or 284, especially at increasingly lower ambient and/or under hood temperatures. Thus, in one example, an amount of power delivered to fans 291 and/or 297 may be reduced by the controller 12 when engine warming by the coolant is desired. In another example, an amount of coolant flowing in line 282 relative to line 284 may be adjusted depending on how much of a cooling effect heater core 255 has on the coolant relative to the radiator 280 (coolant flow may be biased towards the line that has less of a cooling effect on the coolant). In this way, cooling of the coolant when engine warming is desired may be reduced, thereby enhancing warm-up of the engine 10.

In another example, the cooling system 200 may additionally include a warming line 224 that may be coupled on one end to the passage 220 downstream of where coolant exits the engine 10, and on an opposite end to pump 286 for circulating coolant back to the pump 286 without passing through the radiator 280 or heater core 255. That is, warming line 224 may bypass lines 282 and 284, thereby enabling the coolant in passage 220 to not be cooled by either of fans 291 and 297. Thus, when coolant exiting the engine 10 is warmer than ambient temperature, such that the coolant would be cooled if it were circulated through the radiator 280 and/or heater core 255, and engine warming is desired (e.g., the engine is colder than a desired temperature), the coolant may be circulated through warming line 224 without passing through the radiator 280 and/or heater core 255, to keep the coolant warm and prevent cooling from the radiator 280 and/or heater core 255. Thus, if coolant exiting the engine 10 would be further cooled by the radiator 280 and/or heater core 255, and engine warming is desired, then coolant may be circulated through warming line 224, to prevent this further cooling so that the boost device 213 can more quickly add heat to the coolant, and therefore the engine 10. In this way, the coolant may be maintained at a higher temperature than it would have had if it was circulated through the heater core 255 and/or radiator 280, and may thus be circulated back to the boost device 213 to heat up the engine 10 more quickly.

A valve 223 may be positioned in passage 220 to regulate coolant flow through the passage 220 and warming line 224. For example, the valve may be a 3-way valve similar to valve 221 described above. The controller 12 may be in electrical communication with the valve 223 for adjusting a position thereof. The valve 233 may be adjusted to a first position where coolant only flows to lines 282 and/or 284 and not through line 224, and to a second position where coolant only flows to line 224 and not to lines 282 and 284. The valve 223 may also be adjusted to one or more positions between the first and second positions.

Although FIG. 2 describes a system that enables the engine 10 to be warmed with coolant, it should be appreciated that in other examples different engine fluids may be used instead of, or in addition to coolant, to warm the engine 10. As described below in FIG. 3 for example, engine oil may be used additionally or alternatively to coolant to warm the engine.

Turning to FIG. 3, it shows an example engine oil lubrication system 300 that may be included in an engine system (e.g., engine system 100 described above in FIGS. 1A and 1B) as a fluid circuit (e.g., fluid circuit 87 described above in FIGS. 1A and 1B) to warm the engine system during selected conditions.

Oil in engine oil lubrication system 300 may be circulated by an oil pump 308 which may in one example be powered by a rotating crankshaft (e.g., crankshaft 40 shown in FIGS. 1A and 1B) via a mechanical linkage (e.g., drive belt or chain). However, in another example, pump 308 may be an electric pump that is driven by an electric motor that derives power from a battery (e.g., battery 45 described above in FIGS. 1A and 1B) or alternator (e.g., alternator 46 described above in FIGS. 1A and 1B).

Continuing with FIG. 3, the oil pump 308, may suck oil from oil reservoir 304, stored in oil pan or oil sump 302, through supply channel 306. Oil may be delivered from oil pump 308 with pressure through supply channel 310 and oil filter 312 to the engine 10 and/or boost device 213. In particular after passing through the filter 312, oil may either flow through passage 314 to the boost device 213 or directly to the engine 10 via passage 317. Thus in the example shown in FIG. 3, only a portion of the total oil flow pumped to passage 310 by the pump 308 is directed to the boost device 213, while the rest of the oil pumped by pump 308 may flow directly to engine 10 via passage 317 without flowing through the boost device 213. In one embodiment, a valve 337 may be included to regulate the relative amount of oil flowing through passages 314 and 317. Thus, the valve 337 may be adjusted to proportion the total amount of oil pumped by the pump 308 to the boost device 213 via passage 314 and/or directly to the engine 10 via passage 317. Valve 337 may be an electrically actuated valve that may be adjusted by a controller (e.g., controller 12 described above in FIGS. 1A-2). The valve 337 may adjusted between a first position where oil only flows to passage 317 and not passage 314 and a second position where oil only flows to passage 314 and not 317. Valve 337 may be adjusted to a plurality of positions between the first and second positions.

Valve 338 may be adjusted to enable oil to bypass the boost device 213 and flow through bypass passage 316. In one embodiment, Valve 338 may be an electrically actuated valve that may be adjusted by a controller (e.g., controller 12 described above in FIGS. 1A-2) to a first position in which oil only flows from channel 310 to boost device 213, and a second position in which oil only flows from channel 310 to bypass passage 316 and not through boost device 213. The valve 338 may additionally be adjusted to one or more positions between the first and second positions to vary the relative amount of oil flowing between the boost device 213 and bypass passage 316. In another embodiment, valve 338 and bypass passage 316 may not be included, and thus any oil flowing through passage 314 may flow through the boost device 312.

From boost device 213 and/or bypass passage 316, oil may flow to engine 10. Oil may lubricate various rotating and/or moving components in the engine 10 such as camshafts. Oil may then exit engine 10 and may flow back to oil sump 302 via channel 322.

When warming of the engine oil and/or engine 10 is desired, the controller may power on the boost device 213 to warm the oil flowing through the boost device 213 as described above with reference to FIGS. 1A-2. When the boost device 213 is powered it may generate heat which may then be transferred to the engine oil as it passes through the boost device 213. In one example, the controller may additionally adjust the position of the valve 338 to increase oil flow through the boost device 213 relative to the bypass passage 316. In another example, the controller may additionally adjust the position of the valve 337 to increase oil flow through the boost device 213 relative to passage 317. Thus, the controller may adjust the valve 337 towards the second position so that more of the oil pumped by pump 308 is warmed by the boost device 213.

When warming of the engine and/or engine oil is not desired and/or when cooling of the boost device 213 is not desired, the controller may adjust the valve 338 to allow oil to bypass the boost device 213 through bypass passage 316.

Figure 4:
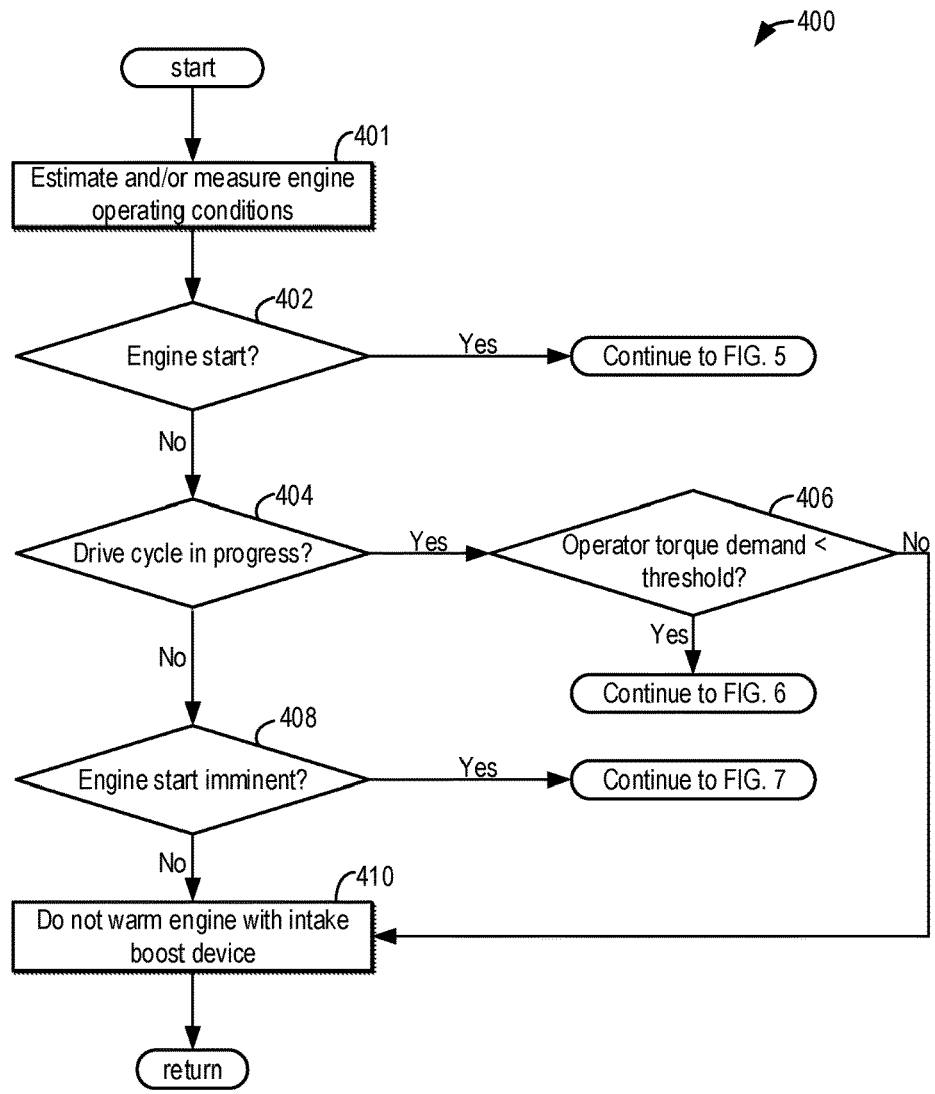
FIG. 4 shows a flow chart of an example method for warming an engine with a motor of an intake boost device.
Figure 5:
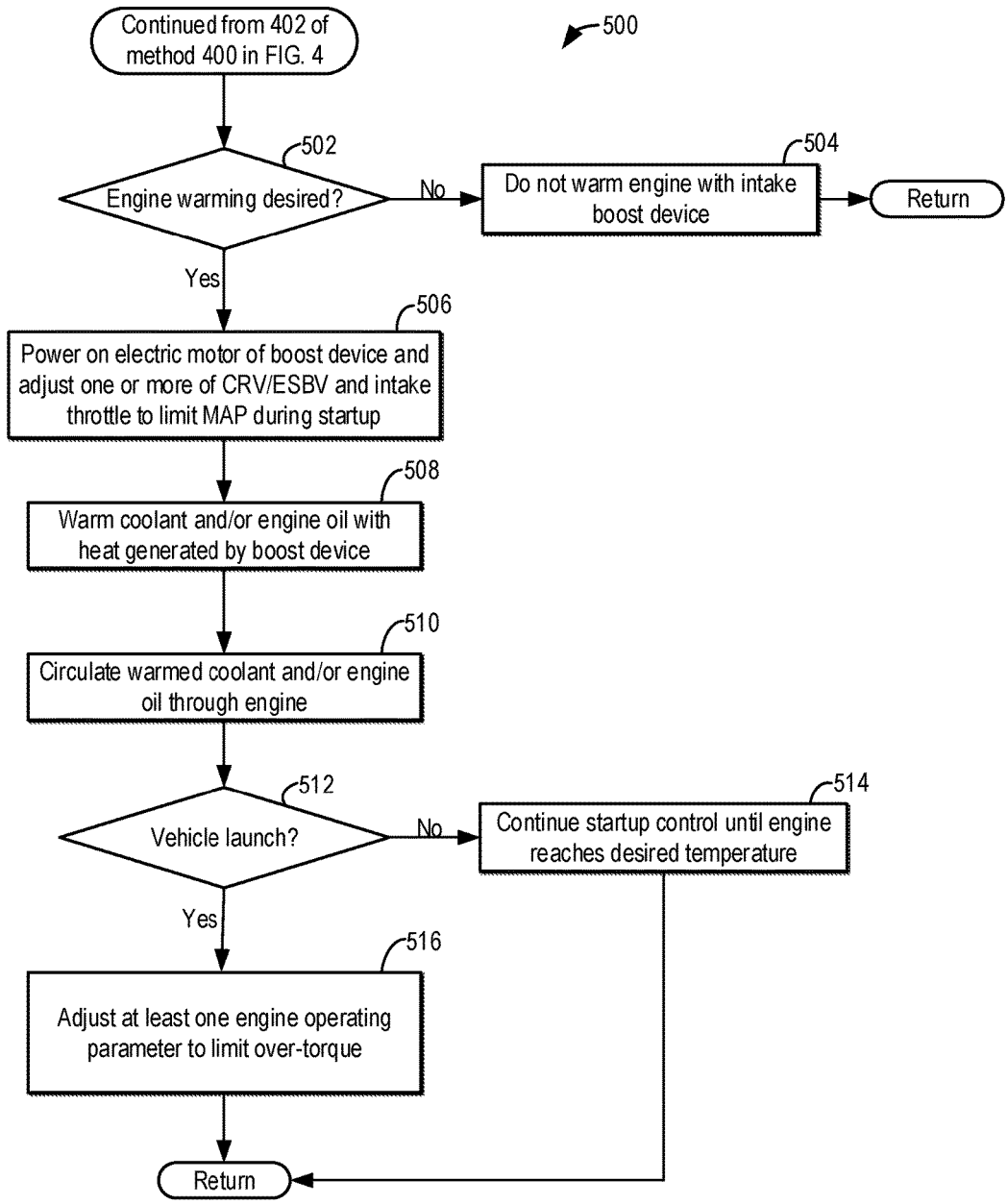
FIG. 5 shows a flow chart of an example method for warming an engine during an engine start.
Figure 6:
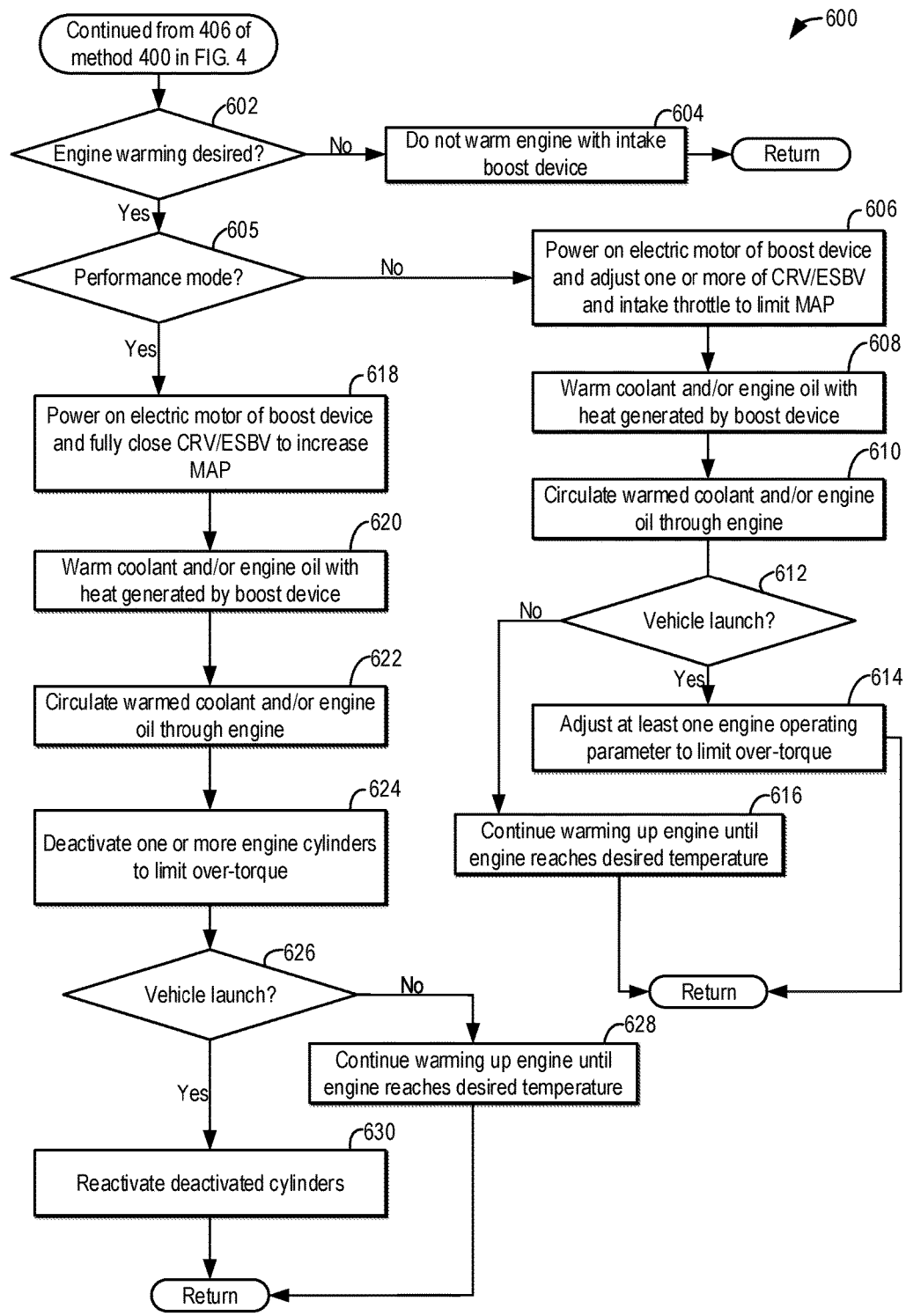
FIG. 6 shows a flow chart of an example method for warming an engine during a drive cycle, such as during engine idle.
Figure 7:
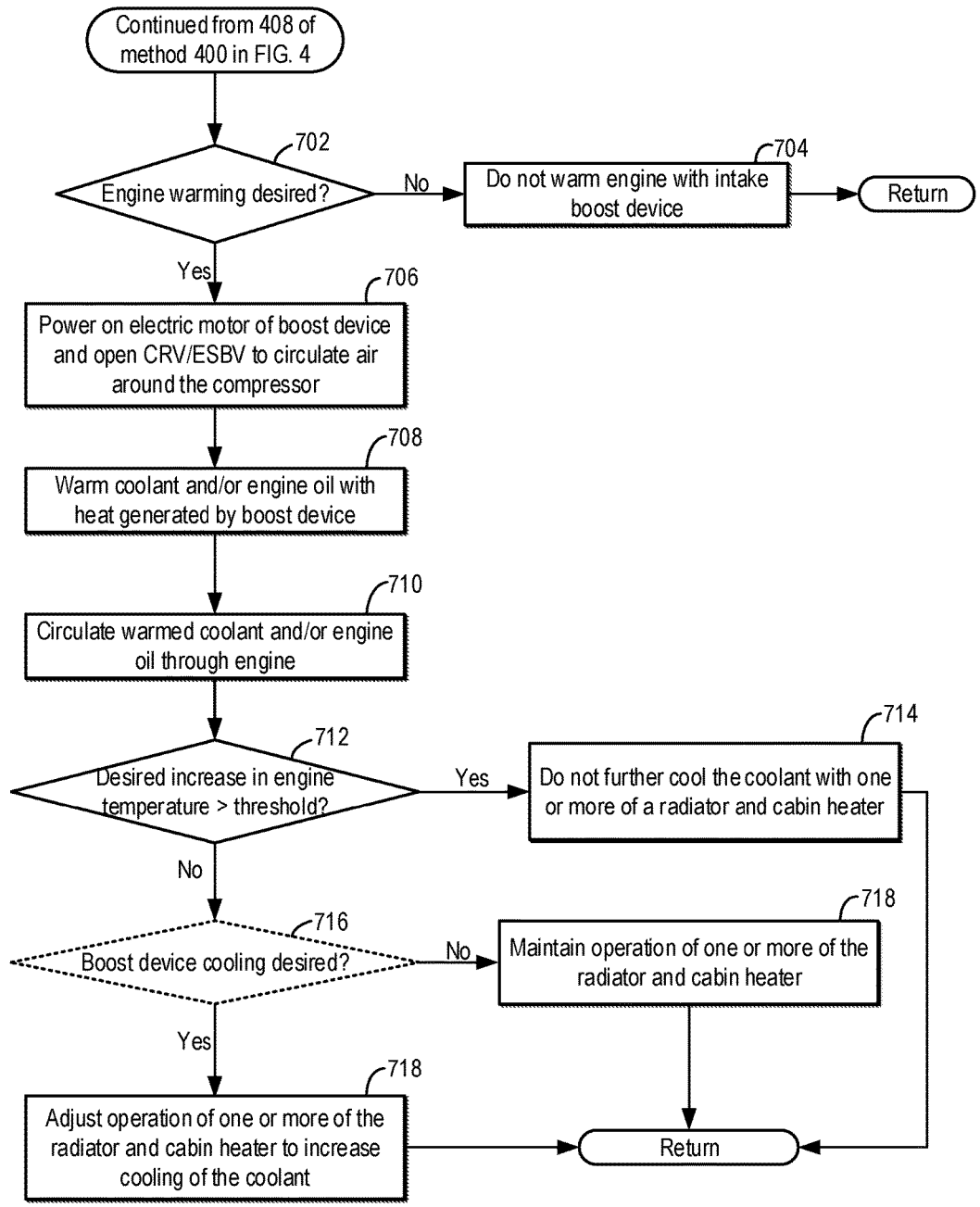
FIG. 7 shows a flow chart of an example method for warming an engine prior to an engine start.

In one example, the boost device 213 may be powered on prior to an engine start and may be used to heat up the engine oil more quickly. By heating the engine oil more quickly before and/or during an engine start, the oil may more effectively lubricate rotating components of the engine 10, thereby reducing wear on engine components and extending the longevity of the engine 10. Turning now to FIGS. 4-7, they show flow charts of example methods for warming up engine fluids (e.g., coolant and/or engine oil) and/or an engine (e.g., engine 10 described above in FIGS. 1A-3) using the heat generated by an intake boost device of the engine that is at least partially driven by an electric motor. FIG. 4, shows an overview of a method for warming up an engine during different engine operating conditions, and FIGS. 5-7 shows specific methods for warming up the engine during each of the different engine operating conditions. For example, FIG. 7, shows an example method for warming up the engine prior to an engine start, FIG. 5, shows an example method for warming up the engine during an engine start, and FIG. 6 shows an example method for warming up the engine after an engine start, while the engine is running (e.g., during engine idle, vehicle operator tip-out, etc.).

Instructions for carrying out the methods described in FIGS. 4-7 may be stored in non-transitory memory of a controller (e.g., controller 12 described above in FIGS. 1A-3). As such, the methods described in FIGS. 4-7 may be executed by the controller based on the stored instructions and in conjunction with signals received from sensors of an engine system (e.g., engine system 100 described above in FIGS. 1A-1B), such as the sensors described above with reference to FIGS. 1A-1B. The controller may employ engine actuators of the engine system to adjust engine operation, according to the methods described below. In particular, the controller may power on an electric motor (e.g., motor 108 described in FIG. 1A, motor 118 described above in FIG. 1B, etc.) of an intake boost device (e.g., supercharger 13 described above in FIG. 1A, turbocharger 15 described above in FIG. 1B), circulate an engine fluid (e.g., coolant and/or engine oil) through the intake boost device and then to the engine to warm the engine.

Focusing now on FIG. 4, method 400 begins at 401 which comprises estimating and/or measuring engine operating conditions. Engine operating conditions may include a boost pressure of intake gasses as estimated based on outputs from one or more pressure sensors (e.g., pressure sensor 56 described above in FIGS. 1A and 1B), a mass airflow rate of intake gasses as estimated based on outputs from a MAF sensor (e.g., MAF sensor 57 described above in FIGS. 1A and 1B), a driver demanded torque or desired engine torque as estimated based on input from a vehicle operator (e.g., vehicle operator 132 shown in FIGS. 1A and 1B) via an input device (e.g., input device 130 shown in FIGS. 1A and 1B), a temperature of the engine and/or engine fluids (e.g., coolant and/or engine oil) based on outputs from a temperature sensor (e.g., temperature sensor 272 described above in FIG. 2), a position of a throttle (e.g., throttle valve 20 described above in FIGS. 1A and 1B) regulating airflow to the one or more engine cylinders, manifold absolute pressure (MAP) as estimated based on outputs from a pressure sensor (e.g., pressure sensor 124 described above in FIGS. 1A and 1B) coupled in an intake manifold (e.g., intake manifold 22 shown in FIGS. 1A and 1B), etc.

Method 400 then continues from 401 to 402 which comprises determining if there is an engine start. If an engine start is in progress, then method 400 may continue from 402 to step 502 of method 500 in FIG. 5. Thus, during an engine start, method 400 may continue to FIG. 5 and may perform the method 500 described in FIG. 5. That is, method 500 may be executed as a subroutine of method 400 when an engine start is occurring. The engine start may comprise an engine start-up routine which may comprise one or more of: cranking the engine with a starter motor (e.g., electric machine 52 described above in FIGS. 1A and 1B) via power from a vehicle battery (e.g., system battery 45 described above in FIGS. 1A and 1B); initiating cylinder combustion by injecting fuel into one or more engine cylinders (combustion chambers 30 described above in FIGS. 1A and 1B) via one or more fuel injectors (fuel injectors 66 described above in FIGS. 1A and 1B); and warming up the engine to a desired operating temperature. The engine start may additionally comprise determining whether there is enough electrical power for running the electric boosting devices when the engine is off. Additionally to stop using the electric boosting devices from adding heat if the electrical power available drops below some value.

However, when an engine start is not occurring (either while the engine is off or has already been running for a threshold duration), then method 400 may continue from 402 to 404 which comprises determining if a drive cycle is in progress. For example a drive cycle may be in progress after the engine has been started and/or after the engine has been running for a threshold duration. In one example, a drive cycle may be in progress once the vehicle operator has tipped in after an engine start. If a drive cycle is in progress, then method 400 may continue from 404 to 406 which may comprise determining if the operator torque demand is less than a threshold and/or if there is a decrease in operator torque demand. In one example, the decrease in operator torque demand may comprise the vehicle operator tipping out (fully releasing the accelerator pedal and/or depressing the brake pedal). The decrease in operator torque demand may comprise a decrease in operator torque demand by more than a threshold that may send the vehicle into DFSO and/or engine idle. For example, the operator torque demand may be less than the threshold during a deceleration fuel shut-off mode (DFSO) where fuel injection is shut off. In another example, the operator torque demand may be less than the threshold during engine idle.

If the operator torque demand is less than the threshold, then method 400 may continue from 406 to step 602 in method 600 of FIG. 6. Thus, while the engine is running and operator torque demand is less than the threshold, such as during engine idle, method 400 may continue to FIG. 6 and may perform the method 600 described in FIG. 6. Thus, method 600 may be executed as a subroutine of method 400 during engine idle and/or other engine operating conditions where operator torque demand is low enough that the temperature of the engine may decrease below a desired temperature. Thus, under running conditions where the engine may tend to run cold, method 600 may be executed. That is method 600 may be executed while the engine is running to warm the engine when the engine temperature drops below a desired temperature, which may occur during engine idle, for example.

However, if operator torque demand is not less than the threshold, and the engine is operating at a torque output level high enough to maintain the desired engine temperature, then engine warming may not be desired, and thus method 400 may continue from 406 to 410 which comprises not warming the engine with the intake boost device. In this way, engine warming may not be desired when the operator torque demand is greater than the threshold because, under such conditions, the engine may produce enough heat by itself to maintain the desired engine temperature.

The method 400 at 410 may comprise one or more of: not powering a motor (e.g., motor 108 described above in FIG. 1A, motor 118 described above in FIG. 1B) of an intake boost device (e.g., supercharger 13 described above in FIG. 1A, turbocharger 15 described above in FIGS. 1A and 1B); and not warming coolant and/or engine oil with the boost device by not circulating coolant and/or engine oil through the intake boost device and/or proximate an outlet of the boost device. For example, an engine controller may power off and/or reduce power to the electric motor of the boost device to reduce an amount of heat generated by the motor. The controller may additionally or alternatively open a boost device bypass valve (e.g., valve 221 described above in FIG. 2 and/or valve 338 described above in FIG. 3). In particular, the controller may adjust the boost bypass valve to a second position where coolant and/or engine oil only flow around the boost device through a bypass passage (e.g., bypass passage 222 described above in FIG. 2 and/or bypass passage 316 described above in FIG. 3) such that coolant and/or engine oil do not flow through the boost device. Method 400 then returns.

Returning to 404, if a drive cycle is not in progress, then method 400 may continue from 404 to 408 which comprises determining if an engine start is imminent. The determining whether an engine start is imminent may be based on vehicle operator commands. For example, an engine start may be imminent when a vehicle operator unlocks the vehicle (e.g., vehicle 102 described above in FIGS. 1A-2). In another example, an engine start may be imminent when a wireless key is detected and/or comes within a threshold distance of the vehicle. In another example, an engine start may be imminent when a vehicle operator depresses a brake pedal and/or releases a parking brake, and/or adjusts the position of their passenger seat. In another example, a vehicle operator may adjust one or more vehicle operator parameters from a software application on their mobile device that may be indicative of an imminent engine start. For example a vehicle operator may start a cabin heating routine from their mobile device that is in wireless communication with the vehicle controller to pre-warm the cabin to a desired temperature prior to the operator entering the cabin. If it is determined that an engine start is imminent (probability that an engine start will occur within a threshold duration is greater than a threshold), then method 400 may continue from 408 to step 702 of method 700 in FIG. 7. Thus, prior to an engine start, while the engine is off, method 400 may continue to FIG. 7 and may perform the method 700 described in FIG. 7 to pre-warm the engine and/or engine oil prior to the engine start.

In some examples, method 400 may only proceed to 702 of method 700 after a long cold soak. That is, method 400 may continue to 702 only if a duration has expired since a most recent drive cycle and/or if a temperature of the engine has decreased to below a threshold while the engine has been off. Therefore, during a normal drive cycle of a start-stop vehicle, where the vehicle may perform repeated starts and stops, method 700 may not continue to 702 of method 700 and may instead continue to 410 of method 400 which comprises not warming the engine with coolant and/or engine oil. This may be implemented in a start-stop vehicle because the engine may only be off for a small amount of time during a drive cycle, and thus the engine may not cool off enough to necessitate engine warming.

However, if an engine start is not imminent, and/or a sufficiently long cold soak has not occurred since the most recent drive cycle, method 400 may continue from 408 to 410 and may not warm the engine with coolant and/or engine oil. Method 400 then returns.

Turning now to FIG. 5, it shows the method 500 for warming the engine during an engine start. Method 500 continues from 402 of method 400 in FIG. 4 if it is determined at 402 that an engine start is occurring, to 502 which comprises determining if engine warming is desired. In one example, engine warming may be desired when the temperature of the engine is less than a desired temperature, where the desired temperature may be a temperature between 90-100° C. In another example, engine warming may be desired when a temperature of coolant and/or a temperature of engine oil are less than respective thresholds.

If engine warming is not desired, then method 500 may continue from 502 to 504 and may not warm the engine with the intake boost device, in the same or similar manner described above at 410 of method 400 in FIG. 4. Method 500 then returns. However, if engine warming is desired at 502, then method 500 may continue from 502 to 506 which comprises powering on the electric motor of the boost device and adjusting one or more of a CRV/ESBV and intake throttle to limit MAP during the engine start. In one example, the controller may supply full power to the motor of the boost device by, for example, providing a 100% duty cycled signal to the motor of the boost device. Thus, the motor may be actuated to maximum power level (e.g., 100% duty cycle). However, in other example, the power to the motor may just be increased (not necessarily to maximum power) to limit boost pressure during the engine start.

In examples where the intake boost device is a supercharger driven by the electric motor (e.g., supercharger 13 described above in FIG. 1A), the method 500 at 506 may comprise adjusting the ESBV (e.g., ESBV 72 described above in FIG. 1A) and/or the intake throttle to limit airflow during startup of the engine to a desired mass airflow rate. In examples where the intake boost device is an electrically assisted turbocharger (e.g., turbocharger 15 described above in FIG. 1B) driven at least partially by the electric motor (e.g., electric motor 118 described above in FIG. 1B), the method 500 at 506 may comprise adjusting the CRV and/or intake throttle to limit MAP during startup of the engine to a desired MAP.

Specifically, the controller may adjust the CRV or ESBV to a more open position to increase an amount of air flowing through the valve. In some examples, the controller may adjust the CRV or ESBV to a fully open position. Additionally, the controller may adjust the intake throttle to a more closed position to further limit MAP. In this way a desired MAP during an engine start may be maintained while powering the intake boost device.

Method 500 may continue from 506 to 508 which comprises warming coolant and/or engine oil with heat generated by the boost device. In particular, the method 500 at 508 may comprise circulating coolant and/or engine oil through a fluid circuit (e.g., fluid circuit 87 described above in FIGS. 1A and 1B), and through the boost device and/or proximate an outlet of the boost device. The controller may adjust the boost device bypass valve to a first position such that coolant and/or engine oil flows only through the boost device and does not bypass the boost device. Thus, in such examples, the controller may adjust the bypass valve so that substantially all of the coolant and/or engine oil flowing to the engine flow through the boost device.

However, in other examples, the controller may adjust the position of the bypass valve to regulate the amount of coolant and/or engine oil flowing through the boost device relative to the bypass passage (e.g., bypass passage 222 described above in FIG. 2 and bypass passage 316 described above in FIG. 3) to regulate an amount of heat transferred to the coolant and/or engine oil circulated to the engine. In this way, an amount of warming of the coolant and/or engine oil supplied to the engine, and therefore an amount of warming of the engine, may be regulated based on the difference between the engine temperature and the desired temperature (the amount of warming desired).

For example, when less warming is desired, the controller may adjust the bypass valve towards the second position to reduce the amount of coolant and/or engine oil flowing through the boost device. When more warming is desired, the controller may adjust the bypass valve towards the first position to increase the amount of coolant and/or engine oil flowing through the boost device.

The controller may circulate coolant by, for example, supplying power to the coolant pump to circulate coolant in the coolant circuit (e.g., coolant passage 220, lines 282, 284, and 224 described above in FIG. 2). The controller may circulate engine oil by, for example supply power to the engine oil pump to circulate engine oil in the engine oil circuit (e.g., channels 306, 310, 322, etc., described above in FIG. 3).

In some examples, the controller may circulate coolant and/or engine oil proximate an outlet of the compressor (e.g., dashed lines of fluid circuit 87 shown in FIG. 1A) to absorb heat from the hot air that has been compressed by the compressor of the boost device. In yet further examples, the controller may circulate coolant through both the boost device and proximate an outlet of the boost device.

Method 500 may continue from 508 to 510 which comprises circulating the warmed coolant and/or engine oil through the engine. In particular, the controller may continue to power the coolant pump and/or engine oil pump such that coolant and/or engine oil that has been warmed by the running intake boost device may then be circulated to the engine. By circulating the coolant and/or engine oil through the running boost device and then to the engine, heat generated by the motor of the boost device may be transferred to the engine via the coolant and/or engine oil. In some examples, the method 500 at 510 may additionally comprise not enriching the air/fuel ratio. Thus, the air/fuel ratio may be maintained at approximately stoichiometry (e.g., 14.7:1) while warming up the engine to the desired temperature.

Method 500 may then continue from 510 to 512 which comprises determining if there is a vehicle launch and/or if a vehicle launch is imminent. Vehicle launch may occur when a vehicle operator tips-in and/or requests for more torque. Thus, after an engine start, a vehicle launch may occur when the vehicle operator depresses the accelerator pedal and requests for the vehicle to begin moving. If there is no vehicle launch, then method 500 may continue from 512 to 514 which comprises continuing the startup control until the engine reaches the desired temperature. Thus, the method may continue to warm the engine via the heat generated by the boost device in the manner described above at 506-510. Method 500 then returns.

However, if at 512 a vehicle launch is imminent and/or is occurring (vehicle operator is about to depress and/or is depressing the accelerator pedal), then method 500 may continue from 512 to 516 which comprises adjusting at least one engine operating parameter to limit over-torque. In one example, the controller may retard spark timing from MBT to prevent the actual torque produced by the engine from exceeding the desired torque as requested by the vehicle operator. In another example, the controller may increase an alternator torque exerted on the engine by the alternator (e.g., alternator 46 described above in FIGS. 1A and 1B) to limit over-torque. In yet another example, the controller may adjust valve timing to limit over-torque. In yet another example, the controller may adjust the throttle to a more closed position than would be ordinarily commanded by electronic throttle control (ETC) based on the torque demand requested by the vehicle operator. Method 500 then returns.

Continuing to FIG. 6, it shows the method 600 for warming the engine while the engine is running but operator demanded torque is sufficiently low (such as during engine idle) such that warming of the engine may be desired. Method 600 continues from 406 of method 400 in FIG. 4 if it is determined at 406 that operator torque demand is less than a threshold, to 602 which comprises determining if engine warming is desired. Engine warming may be desired when the engine temperature is less than the desired temperature as described above at 502 of method 500 in FIG. 5. If engine warming is not desired, then method 500 continues from 602 to 604 which comprises not warming the engine with the intake boost device in the same or similar manner as described above at 504 of method 500 in FIG. 5. Method 500 then returns.

However, if engine warming is desired, then method 500 may proceed from 602 to 605 which comprises determining if the vehicle is operating in a performance mode. The performance mode may be a vehicle operating mode where maximum torque and/or traction are desired. The different performance modes may enable vehicle settings to be configured to improve the performance of selected vehicle maneuvers. Additionally or alternatively, the different performance modes may enable vehicle settings to be configured to improve the maneuverability and driveability of the vehicle on selected terrains. As an example, an operator may select a performance mode of a boosted vehicle (e.g., via a button) wherein the performance mode is geared to a specific terrain or weather condition, such as a sand mode or baja mode or snow mode. Responsive to the selection, one or more traction control settings of the vehicle may be adjusted to improve traction for the corresponding terrain. In addition, to improve the power output and boosted engine response of the vehicle in the selected performance mode, boost actuator settings may be adjusted.

If the performance mode has not been selected, then method 600 may continue from 605 to 606 which comprises powering on the electric motor of the boost device and adjusting one or more of the CRV/ESBV and intake throttle to limit MAP to a desired MAP, in the same or similar manner as described above in 506 of method 500 in FIG. 5, except that the desired MAP may be different while the engine is running than when the engine is starting as it is in FIG. 5. Further, method 500 may continue from 606 to 608 to warm coolant and/or engine oil with heat generated by the boost device in the same or similar manner as described above at 508 of method 500 in FIG. 5. Method 500 may continue from 608 to 610 and circulate warmed coolant and/or engine oil through the engine in the same or similar manner to that described above at 510 of method 500 in FIG. 5. Steps 612-616 may also be performed in the same or similar manner to that described above in 512-516, respectively of method 500 in FIG. 5. Method 600 then returns.

However, if the performance mode has been selected at 605, method 600 continues from 605 to 618 which comprises powering on the electric motor of the boost device and fully closing the CRV/ESBV to increase the manifold absolute pressure (MAP). Thus, the ESBV (in examples where the engine includes the electric supercharger) and/or CRV (in example where the engine includes the electrically assisted turbocharger) may be adjusted to their respective closed positions, such that substantially all of the intake air is forced through the compressor of the supercharger and/or turbocharger. The method 600 at 618 may additionally comprise opening and/or fully opening the throttle. The method 600 at 618 may additionally comprise closing the turbocharger waste-gate valve (e.g., wastegate actuator 92 described above in FIGS. 1A and 1B). In this way, MAP may be kept substantially high in anticipation of an upcoming tip-in during the performance mode. Further, the speed of the compressors of the supercharger and/or turbocharger may be kept relatively high during a vehicle operator tip-out, so that when a vehicle operator tips-in, the engine may respond more quickly to the increased demand in torque.

Method 600 then continues from 618 to 620 which comprises warming coolant and/or engine oil with heat generated by the boost device in the same or similar manner to that described above at 508 of method 500 in FIG. 5. Method 600 may then proceed from 620 to 622 which comprises circulating warmed coolant and/or engine oil through the engine in the same or similar manner to that described above at 510 of method 500 in FIG. 5. Method 600 may then proceed from 622 to 624 which comprises deactivating one or more engine cylinders to limit over-torque. It should be appreciated, that in some examples, the controller may execute one or more, or all of steps 618-624 substantially simultaneously or in a different order than described.

Because, the ESBV/CRV may be closed and the electric motor may be fully powered even when the operator tips-out in the performance mode, the engine may provide too much torque unless one or more torque-limiting strategies are employed. Thus, the deactivating the one or more engine cylinder may comprise shutting off fuel injection to one or more of the engine cylinders to limit the amount of torque produced by the engine when the vehicle operator tips-out during the performance mode. This may be achieved by, for example, the controller sending control signals to the fuel injectors (e.g., fuel injectors 66 described above in FIGS. 1A and 1B) to not inject fuel into their respective cylinders. The number of cylinders that are deactivated may be determined based on the difference between the desired torque (as commanded by the vehicle operator) and the amount of torque that is, or will be produced if all the cylinders are activated. Thus, the controller may determine the number of cylinders needed to be deactivated to reduce the torque to the desired torque, where the number of cylinder to be deactivated increases as the difference between the actual torque output by the engine and the desired torque increases.

Method 600 may then continue from 624 to 626 which comprises determining if there is a vehicle launch in the same or similar manner to that described above at 512 of method 500 in FIG. 5. If there is not a vehicle launch, then method 600 may continue to warm up the engine in the manner described above at 618-624 of method 600 until the engine reaches the desired temperature. Method 600 then returns. However, if there is a vehicle launch, then the method 600 may continue from 626 to 630 which comprises reactivating the cylinder that were deactivated at 624. Since one or more of the CRV/ESBV and waste-gate valve may already be closed (at 618), and/or the throttle may already be open (at 618), the controller may not need to open the throttle or close the CRV/ESBV and/or waste-gate to increase MAP during the vehicle launch. Thus, the engine may provide a more responsive acceleration during the vehicle launch in the performance mode. Further, since the engine may heat up quickly when the operator tips-in and the vehicle launch is initiated, the controller may no longer warm coolant and/or engine oil with the boost device, as engine warming may no longer be desired. Method 600 then returns.

Proceeding to FIG. 7, it shows the method 700 for warming the engine and/or engine fluids (e.g., engine oil, coolant, etc.) prior to an engine start. Method 700 continues from 408 of method 400 in FIG. 4 if it is determined at 408 that an engine start if imminent, to 702 which comprises determining if engine warming is desired. Engine warming prior to an engine start may be desired after a long cold soak for example, where the temperature of the engine has decreased to approximately ambient temperature or below a threshold. Thus, it may be desired to warm the engine prior to an engine start when the engine has cooled off after a relatively long cold soak (between drive cycles). Engine warming may additionally or alternatively be desired prior to an engine start when a temperature of engine oil is less than a threshold. Thus, engine warming may be desired prior to an engine start to heat engine oil such that it may more effectively lubricate rotating engine components during the ensuing engine start.

If engine warming is not desired at 702, then method 700 may continue to 704 which comprises not warming the engine with the intake boost device in the same or similar manner to that described above at 504 of method 500 in FIG. 5. Method 700 then returns. However, if engine warming is desired at 702 then method 700 may continue to 706 which comprises powering on the electric motor of the boost device and opening the CRV/ESBV to circulate air around the compressor. The electric motor may be powered on the full, maximum power, as described above in 506 of method 500 in FIG. 5. However, since the engine is not running, the CRV and/or ESBV may be fully opened so that air may be re-circulated around the compressor (from the outlet back to the inlet) continually while the engine remains off.

The method 700 at 706 may additionally comprise determining whether there is enough electrical power for running the electric boost device when the engine is off. For example, while the engine is off, the controller may monitor the charge of the vehicle battery from which the electric boost device derives electrical power. If the charge of the battery is greater than a threshold, then the controller may allow the boost device to be powered on. However, if the charge of the battery is less than the threshold, then the controller may power off the boost device to prevent the vehicle battery from being drained to a level where it would no longer be able to start the engine. Thus, power provided to the motor of the boost device when the engine is off may also be regulated based on the charge level of the vehicle battery and may be restricted to maintain a sufficient level of charge in the vehicle battery.

Method 700 may then continue from 706 to 708 which comprises warming coolant and/or engine oil with heat generated by the boost device in the same or similar manner to that described above at 508 of method 500 in FIG. 5. Further, the method 700 may continue from 708 to 710 and may circulate warmed coolant and/or engine oil through the engine in the same or similar manner to that described above at 510 of method 500 in FIG. 5. However, in steps 706-710, the engine is not running, and thus, the controller may power on the electric motor of the boost device and the coolant pump and/or engine oil pump via stored electrical energy. For example, the controller may supply power to the one or more electrical devices via the vehicle battery, or their own dedicated batteries (e.g., battery 105 described above in FIG. 1A).

Method 700 then proceeds from 710 to 712 which comprises determining if the desired increase in engine temperature (e.g., difference between the current engine temperature and the desired engine temperature) is greater than a threshold. Thus, the controller may periodically monitor engine temperature via the engine temperature sensor while the engine is off. If the desired increase in engine temperature is greater than the threshold, then method 700 may continue from 712 to 714 which comprises not further cooling the coolant with one or more of a radiator (e.g., radiator 280 described above in FIG. 2) and cabin heater (e.g., heater core 255 described above in FIG. 2), in examples where coolant is warmed by the boost device. By not further cooling the coolant after it has warmed the engine and left the engine, the coolant may be heated up more quickly by the boost device.

In one example, the controller may not further cool the coolant after it has flowed through the engine by bypassing the radiator and cabin heater. For example, the controller may open a bypass valve (e.g., valve 223 described above in FIG. 2) to allow coolant to flow through a bypass channel (e.g., warming line 224 described above in FIG. 2) directly back to the coolant pump without flowing through the radiator and/or cabin heater. In another example, the controller may not further cool the coolant once it has exited the engine by maintaining one or more of the radiator fan (e.g., fan 291 described above in FIG. 2) and cabin heater fan (e.g., fan 297 described above in FIG. 2) off. For example, the controller may command for substantially no electrical power (e.g., 0% duty cycle) to be supplied to the actuators (e.g., motors 293 and 295 described above in FIG. 2) of the fans. Method 700 then returns.

However if the desired increase in engine temperature is not greater than the threshold at 712, then method 700 may optionally continue to 716 which comprises determining if cooling of the boost device is desired. For example, when running the electric motor of the boost device, the motor may overheat. To prevent and/or limit overheating of the electric motor, the controller may further cool the coolant after it has exited the engine to increase the coolant's cooling effect on the electric motor when it circulates back through the boost device. Thus, boost device cooling may be desired when the temperature of the boost device and/or electric motor increases above a threshold. When cooling of the boost device is desired, method 700 may continue from 716 to 718 which comprises adjusting operation of one or more of the radiator and cabin heater to increase cooling of the coolant.

In particular, the controller may increase an amount of electrical power supplied to the actuators of the radiator fan and heater core fan. For example, the controller may power on the radiator fan and/or cabin heater fan, since they may be off prior to the engine start. By powering on the radiator fan and/or cabin heater fan, the temperature of the coolant may be further reduced after it leaves the engine and prior to it being recirculated back to the intake boost device. In this way, enhanced cooling of the boost device may be achieved while the engine is off and while the radiator and/or heater core would normally be off. Method 700 then returns.

However, if boost device cooling is not desired, then method 700 may continue from 716 to 718 which comprises maintain operation of one or more of the radiator and cabin heater. For example, the controller may maintain the motors of the radiator fan and cabin heater fan off prior to the engine start. Method 700 then returns.

In one representation, a method for an engine may comprise powering on an electric motor of an intake boost device to generate heat; absorbing heat from one or more of the boost device and air compressed by the boost device via one or more of circulated coolant and circulated engine oil; and after absorbing the heat, transferring the absorbed heat to the engine by flowing one or more of the circulated coolant and circulated engine oil to the engine. In a first example of the method, the absorbing heat from one or more of the boost device and air compressed by the boost device comprises flowing one or more of the circulated coolant and circulated engine oil through the boost device by powering one or more of a coolant pump and engine oil pump. A second example of the method optionally includes the first example and further includes wherein the absorbing heat from one or more of the boost device and air compressed by the boost device comprises flowing one or more of the circulated coolant and circulated engine oil through a conduit that is in direct thermal contact with one or more of an outlet of the boost device and an intake conduit proximate an outlet of the boost device. A third example of the method optionally includes one or more of the first through second examples and further includes prior to an engine start, opening a compressor recirculation valve (CRV) or electric supercharger bypass valve (ESBV) while powering on the electric motor of the boost device. A fourth example of the method optionally includes one or more of the first through third examples and further includes when the engine is running, closing a CRV or ESBV in addition to the powering on the electric motor, absorbing heat, and transferring the absorbed heat to the engine. A fifth example of the method optionally includes one or more of the first through fourth examples and further includes, when the engine is running and a desired torque output is less than a threshold, in addition to the closing the CRV or ESBV, powering on the electric motor, absorbing heat, and transferring the absorbed heat to the engine: fully opening an intake throttle valve; fully closing a turbocharger waste-gate valve; and adjusting at least one engine operating parameter to limit an amount of torque output by the engine. A sixth example of the method optionally includes one or more of the first through second examples and further includes wherein the adjusting at least one engine operating parameter comprises deactivating one or more cylinders of the engine by shutting off fuel to the one or more cylinders. A seventh example of the method optionally includes one or more of the first through sixth examples and further includes when the engine is running and the desired torque output is greater than or equal to the threshold, reactivating the one or more engine cylinders that are deactivated. An eighth example of the method optionally includes one or more of the first through seventh examples and further includes wherein the boost device comprises a supercharger that is at least partially driven by the motor and is positioned upstream of a turbocharger. A ninth example of the method optionally includes one or more of the first through eighth examples and further includes wherein the boost device comprises an electrically-assisted turbocharger that is coupled to the motor for receiving power therefrom.

In another representation, a method for an engine comprises circulating one or more of coolant and engine oil through a boost device and the engine via one or more of a coolant pump and an engine oil pump, respectively, when a temperature of the engine is less than a desired temperature; and additionally prior to an engine start: powering on a motor of the boost device; and opening a compressor bypass valve (CBV); and when the engine is running: maintaining full-power operation of the motor; closing the CBV; and adjusting one or more engine operating parameters to limit torque output to a desired torque output level. In a first example of the method, the method may further comprise wherein the maintaining full-power operation of the motor; closing the CBV; and adjusting one or more engine operating parameters to limit torque output to a desired torque output level when the engine is running are performed responsive to a decrease in operator torque demand. A second example of the method may optionally include the first example and further includes wherein the decrease in operator torque demand comprises an operator pedal tip-out. A third example of the method optionally includes one or more of the first and second example and further includes one or more of: fully opening an intake throttle valve, fully closing a turbocharger waste-gate valve, and fully closing a turbocharger bypass valve responsive to the decrease in operator torque demand. A fourth example of the method optionally includes one or more of the first through third examples and further includes wherein the adjusting the one or more engine operating parameters to limit torque output to the desired torque output level comprises deactivating one or more fuel injectors of one or more engine cylinders of the engine, and wherein the method further comprises reactivating the one or more fuel injectors responsive to an increase in operator torque demand. A fifth example of the method optionally includes one or more of the first through fourth examples and further includes, in addition to circulating one or more of coolant and engine oil through the boost device and the engine when the temperature of the engine is less than the desired temperature, powering off one or more of a radiator fan and a cabin heater fan when the temperature of the engine is less than the desired temperature by more than a threshold amount. A sixth example of the method optionally includes one or more of the first through fifth examples and further includes, in addition to circulating one or more of coolant and engine oil through the boost device and the engine when the temperature of the engine is less than the desired temperature, circulating one or more of the coolant and engine oil directly back to one or more of the coolant pump and engine oil pump without circulating the one or more of the coolant and engine oil through a radiator and cabin heater when the temperature of the engine is less than desired by more than a threshold amount. A seventh example of the method optionally includes one or more of the first through sixth examples and further includes, when the temperature of the engine is not less than the desired temperature, circulating one or more of coolant and engine oil around the boost device and not circulating one or more of the coolant and engine oil through the boost device when a temperature of the boost device is less than a threshold.

In yet another representation, an engine system may comprise an oil pump; a coolant pump; an engine block fluidically coupled to one or more of the coolant pump and oil pump, the engine block comprising one or more engine cylinders; an intake boost device at least partially driven by an electric motor and fluidically coupled to the engine and one or more of the coolant pump and oil pump; a boost device bypass valve that enables airflow around the intake boost device in an open position; and a controller with computer readable instructions stored in non-transitory memory of the controller for: powering the electric motor of the intake boost device to generate heat; powering one or more of the coolant pump and oil pump to circulate one or more of coolant and engine oil through the intake boost device and the engine; opening the boost device bypass valve when the engine is off; and closing the boost device bypass valve when the engine is running. A first example of the engine system may further include, wherein the controller further includes computer readable instructions stored in non-transitory memory of the controller for deactivating the one or more engine cylinders, closing a turbocharger waste-gate valve, and opening an intake throttle valve of the engine system responsive to a decrease in operator demanded torque while maintaining power to the electric motor and maintain the boost device bypass valve closed.

In a further representation, a method may comprise when warming of the engine is desired: providing full power to a motor of a boost device to generate heat; circulating one or more of coolant and engine oil through the boost device and then to the engine to transfer heat from the boost device to the engine without cooling the one or more of coolant and engine oil with one or more of a radiator and cabin heater; and when warming of the engine is not desired: adjusting an amount of power supplied to the motor of the boost device to maintain a desired torque output; cooling one or more of the coolant and engine oil with one or more of the radiator and cabin heater. In a first example of the method, the method may further include wherein warming of the engine is desired when one or more of: a temperature of coolant of the engine is less than a threshold, a temperature of engine oil of the engine is less than a threshold, and a temperature of the engine is less than a threshold. A second example of the method may optionally include the first example and may further include wherein the circulating one or more of coolant and engine oil through the boost device and then to the engine without cooling the one or more of coolant and engine oil with one or more of a radiator and cabin heater comprises bypassing one or more of the radiator and cabin heater and not circulating one or more of the coolant and engine oil through the radiator and cabin heater. A third example of the method may optionally include one or more of the first and second examples and may further include, wherein the circulating one or more of coolant and engine oil through the boost device and then to the engine without cooling the one or more of coolant and engine oil with one or more of a radiator and cabin heater comprises powering off one or more of a fan of the cabin heater and a fan of the radiator. A fourth example of the method may optionally include one or more of the first through third examples, and may further include wherein the cooling one or one or more of the coolant and engine oil with one or more of the radiator and cabin heater comprises powering on one or more of a fan of the cabin heater and a fan of the radiator and circulating one or more of the coolant and engine oil through the radiator and cabin heater. A fifth example of the method may optionally include one or more of the first through fourth examples, and may further include, when warming of the engine is desired, opening a compressor recirculation valve (CRV) when the engine is not running; and closing a compressor recirculation valve (CRV) when the engine is running. A sixth example of the method may optionally include one or more of the first through fifth examples, and may further include, when warming of the engine is desired and the engine is running, disabling one or more fuel injectors and shutting off fuel injection to one or more cylinders of the engine when a torque output by the engine is greater than an operator demanded torque, where the number of fuel injectors that are disabled increases as the operator demanded torque decreases. A seventh example of the method may optionally include one or more of the first through sixth examples, and may further include, one or more of, when warming of the engine is desired and the engine is running: increasing an alternator torque, retarding spark timing, and opening a waste-gate valve of a turbocharger, when a torque output by the engine is greater than an operator demanded torque.

In this way, warming of an engine may be achieved without enriching the air/fuel ratio or while reducing the amount of enriching needed to warm the engine to a desired temperature. In particular, by powering on an electric motor of an intake boost device, and circulating engine fluids (e.g., coolant, engine oil etc.,) through the boost device and engine, heat generated by the boost device may transferred to the engine via the engine fluids to warm the engine, air/fuel enrichment during warm-up of an engine may be minimized or eliminated altogether. Thus, heating of the engine may be achieved by running the motor of the boost device instead of enriching the air/fuel ratio. By reducing the amount of enrichment used to warm up the engine and/or eliminating enrichment entirely, a technical effect of reducing tailpipe emissions may be achieved. Further the technical effect of reduced engine wear and degradation may be further achieved by minimizing and/or eliminating entirely enrichment of the air/fuel ratio because fuel dilution of the engine may be reduced.

Further, prior to an engine start, engine oil may be pre-heated by flowing it through the running boost device. A technical effect of reducing engine wear is achieved by heating the engine oil with the intake boost device. Specifically, by heating the engine oil prior to an engine start, the lubricative effectiveness of the engine oil may be increased, thereby enhancing lubrication and longevity of rotating engine components.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid engine system comprising: powering on an electric motor of an intake boost device to generate heat; absorbing heat from one or more of the boost device and air compressed by the boost device via one or more of circulated coolant and circulated engine oil; after absorbing the heat, transferring the absorbed heat to an engine by flowing one or more of the circulated coolant and circulated engine oil to the engine; and responsive to a decrease in operator demanded torque: maintaining power to the electric motor, maintaining a boost device bypass valve closed, and deactivating one or more engine cylinders, closing a boost device waste-gate valve, and opening an intake throttle valve of the engine.

2. The method of claim 1, wherein the absorbing heat from one or more of the boost device and air compressed by the boost device comprises flowing one or more of the circulated coolant and circulated engine oil through the boost device by powering one or more of a coolant pump and an engine oil pump.

3. The method of claim 1, wherein the absorbing heat from one or more of the boost device and air compressed by the boost device comprises flowing one or more of the circulated coolant and the circulated engine oil through a conduit that is in direct thermal contact with one or more of an outlet of the boost device and an intake conduit proximate the outlet of the boost device.

4. The method of claim 1 further comprising, prior to an engine start, opening a compressor recirculation valve (CRV) or electric supercharger bypass valve (ESBV) while powering on the electric motor of the boost device.

5. The method of claim 1 further comprising, when the engine is running, closing a CRV or ESBV in addition to the powering on the electric motor, absorbing heat, and transferring the absorbed heat to the engine.

6. The method of claim 5 further comprising, when the engine is running and a desired torque output is less than a threshold, in addition to the closing the CRV or ESBV, powering on the electric motor, absorbing heat, and transferring the absorbed heat to the engine: fully opening an intake throttle valve; fully closing a turbocharger waste-gate valve; and adjusting at least one engine operating parameter to limit an amount of torque output by the engine.

7. The method of claim 6, wherein the adjusting at least one engine operating parameter comprises deactivating one or more cylinders of the engine by shutting off fuel to the one or more cylinders.

8. The method of claim 7 further comprising, when the engine is running and the desired torque output is greater than or equal to the threshold, reactivating the one or more engine cylinders that are deactivated.

9. The method of claim 1, wherein the boost device comprises a supercharger that is at least partially driven by the electric motor.

10. The method of claim 1, wherein the boost device comprises an electrically-assisted turbocharger that is coupled to the electric motor for receiving power therefrom.

11. A method for a hybrid engine system comprising: circulating one or more of coolant and engine oil through a boost device and an engine via one or more of a coolant pump and an engine oil pump, respectively, when a temperature of the engine is less than a desired temperature; and additionally prior to an engine start: powering on a motor of the boost device; and opening a compressor bypass valve (CBV); and when the engine is running: maintaining full-power operation of the motor; closing the CBV; and adjusting one or more engine operating parameters to limit torque output to a desired torque output level; and responsive to a decrease in operator demanded torque: maintaining power to the motor, maintaining the CBV closed, and deactivating one or more engine cylinders, closing a boost device waste-gate valve, and opening an intake throttle valve of the engine.

12. The method of claim 11, wherein the maintaining full-power operation of the motor; closing the CBV; and adjusting one or more engine operating parameters to limit torque output to the desired torque output level when the engine is running are performed responsive to a decrease in operator torque demand.

13. The method of claim 12, wherein the decrease in operator torque demand comprises an operator pedal tip-out.

14. The method of claim 12, further comprising one or more of: fully opening an intake throttle valve, fully closing a turbocharger waste-gate valve, and fully closing a turbocharger bypass valve responsive to the decrease in operator torque demand.

15. The method of claim 12, wherein the adjusting the one or more engine operating parameters to limit torque output to the desired torque output level comprises deactivating one or more fuel injectors of one or more engine cylinders of the engine, and wherein the method further comprises reactivating the one or more fuel injectors responsive to an increase in operator torque demand.

16. The method of claim 11 further comprising, in addition to circulating one or more of coolant and engine oil through the boost device and the engine when the temperature of the engine is less than the desired temperature, powering off one or more of a radiator fan and a cabin heater fan when the temperature of the engine is less than the desired temperature by more than a threshold amount.

17. The method of claim 11 further comprising, in addition to circulating one or more of coolant and engine oil through the boost device and the engine when the temperature of the engine is less than the desired temperature, circulating one or more of the coolant and engine oil directly back to one or more of the coolant pump and engine oil pump without circulating the one or more of the coolant and engine oil through a radiator and a cabin heater when the temperature of the engine is less than desired by more than a threshold amount.

18. The method of claim 11 further comprising, when the temperature of the engine is not less than the desired temperature, circulating one or more of coolant and engine oil around the boost device and not circulating one or more of the coolant and engine oil through the boost device when a temperature of the boost device is less than a threshold.

19. An engine system comprising: an oil pump; a coolant pump; an engine block fluidically coupled to one or more of the coolant pump and the oil pump, the engine block comprising one or more engine cylinders; an intake boost device at least partially driven by an electric motor and fluidically coupled to an engine and one or more of the coolant pump and the oil pump; a boost device bypass valve that enables airflow around the intake boost device in an open position; and a controller with computer readable instructions stored in non-transitory memory of the controller for: powering the electric motor of the intake boost device to generate heat; powering one or more of the coolant pump and the oil pump to circulate one or more of coolant and engine oil through the intake boost device and the engine; opening the boost device bypass valve when the engine is off; closing the boost device bypass valve when the engine is running; and deactivating the one or more engine cylinders, closing a turbocharger waste-gate valve, and opening an intake throttle valve of the engine system responsive to a decrease in operator demanded torque while maintaining power to the electric motor and maintaining the boost device bypass valve closed.

* * * * *